US011091196B2

(12) United States Patent
Kataoka

(10) Patent No.: US 11,091,196 B2
(45) Date of Patent: Aug. 17, 2021

(54) STEERING CONTROL DEVICE

(71) Applicant: DENSO CORPORATION, Kariya (JP)

(72) Inventor: Motoaki Kataoka, Kariya (JP)

(73) Assignee: DENSO CORPORATION, Kariya (JP)

(*) Notice: Subject to any disclaimer, the term of this patent is extended or adjusted under 35 U.S.C. 154(b) by 46 days.

(21) Appl. No.: 16/598,234

(22) Filed: Oct. 10, 2019

(65) Prior Publication Data
US 2020/0039577 A1 Feb. 6, 2020

Related U.S. Application Data

(63) Continuation of application No. PCT/JP2018/010981, filed on Mar. 20, 2018.

(30) Foreign Application Priority Data

Apr. 14, 2017 (JP) .............................. JP2017-080440

(51) Int. Cl.
*B62D 5/04* (2006.01)
*B62D 6/00* (2006.01)

(52) U.S. Cl.
CPC ......... *B62D 5/0463* (2013.01); *B62D 5/0466* (2013.01); *B62D 6/008* (2013.01)

(58) Field of Classification Search
CPC ..... B62D 5/0463; B62D 5/0466; B62D 6/008
See application file for complete search history.

(56) References Cited

U.S. PATENT DOCUMENTS

| 2010/0044146 A1* | 2/2010 | Kasai .................. B62D 5/0481 180/446 |
| 2013/0060427 A1* | 3/2013 | Kataoka ............... B62D 5/0466 701/42 |
| 2017/0183029 A1* | 6/2017 | Uryu ..................... H02P 29/028 |
| 2017/0253266 A1 | 9/2017 | Minamiguchi et al. |
| 2017/0369093 A1* | 12/2017 | Kusatani ................. B62D 6/00 |
| 2018/0145622 A1* | 5/2018 | Kishioka ............. H02P 21/0089 |
| 2018/0194389 A1* | 7/2018 | Imamura .............. B62D 5/0469 |
| 2018/0354549 A1* | 12/2018 | Tsubaki ................ H02P 29/024 |
| 2019/0016378 A1* | 1/2019 | Itou ............................ H02P 5/46 |
| 2019/0165712 A1* | 5/2019 | Pramod ................ B62D 5/0481 |
| 2019/0168801 A1* | 6/2019 | Takase ..................... B62D 6/00 |
| 2019/0337556 A1* | 11/2019 | Tsubaki ............... B62D 15/025 |

FOREIGN PATENT DOCUMENTS

| JP | 5533822 B2 | 6/2014 |
| JP | 2014-237375 A | 12/2014 |
| JP | 2015-33941 A | 2/2015 |
| JP | 2015-205636 A | 11/2015 |
| JP | 2016-49803 A | 4/2016 |

* cited by examiner

*Primary Examiner* — Jeff A Burke
*Assistant Examiner* — Mohamad O El Sayah
(74) *Attorney, Agent, or Firm* — Maschoff Brennan

(57) ABSTRACT

A servo controller calculates a base assist torque so that a steering torque follows a target steering torque. A convergence control calculation unit provided as a correction control calculation unit calculates a correction control value in accordance with a steering speed which is a steering state value. A torque converter outputs a torque limit value determined by converting a current limit value into a torque to a servo limit value calculation unit. The servo limit value calculation unit calculates the servo limit value so that an absolute value of the servo limit value to be larger than an absolute value of the torque limit value in at least a part of a region of the steering speed or the correction control value.

19 Claims, 20 Drawing Sheets

FIRST EMBODIMENT

COMPARISON EXAMPLE

COMPARISON EXAMPLE

STEERING CONTROL DEVICE

CROSS REFERENCE TO RELATED APPLICATION

The present application is a continuation application of International Patent Application No. PCT/JP2018/010981 filed on Mar. 20, 2018, which designated the U.S. and claims the benefit of priority from Japanese Patent Application No. 2017-80440 filed on Apr. 14, 2017. The entire disclosures of all of the above-referenced applications are incorporated herein by reference.

FIELD

The present disclosure relates to a steering control device.

BACKGROUND

It is known to limit an output of a servo controller in a conventional steering control device, which calculates a base assist value (Tb*) by servo calculation so that a steering torque (Ts) follows a target steering torque (TS*). For example, a steering control device calculates a base assist value by using a previous value of an output of an assist controller (that is, servo controller) after output limitation to suppress a reset windup in an integral calculation.

SUMMARY

According to the present disclosure, a steering control device is provided for controlling current supply to a motor to generate an assist torque in correspondence to a steering torque. The steering control device comprises a processing unit with a memory storing control processing. The processing unit is configured to execute the control processing. The processing unit calculates a target steering torque which is a target value of the steering torque. The processing unit calculates a base assist torque so that the steering torque follows the target steering torque. The processing unit calculates a servo limit value which limits an output of the servo controller, a polarity of which is defined to be positive or negative in accordance with a direction of steering. The processing unit calculates a correction control value in accordance with a steering state value which is a physical value reflecting a steering state. The processing unit calculates a current command value to be supplied to the motor based on an assist torque command value determined by adding the correction control value to the base assist value. The processing unit calculates a current limit value with respect to the current command value. The processing unit outputs a torque limit value determined by converting the current limit value into a torque. The processing unit calculates the servo limit value having an absolute value to be larger than an absolute value of the torque limit value in at least a part of a region of the steering state value or the correction control value.

BRIEF DESCRIPTION OF THE DRAWINGS

The above and other objects, features and advantages of the present disclosure will become more apparent from the following detailed description taken in conjunction with the accompanying drawings. In the drawings.

EMBODIMENT

Figure 1:
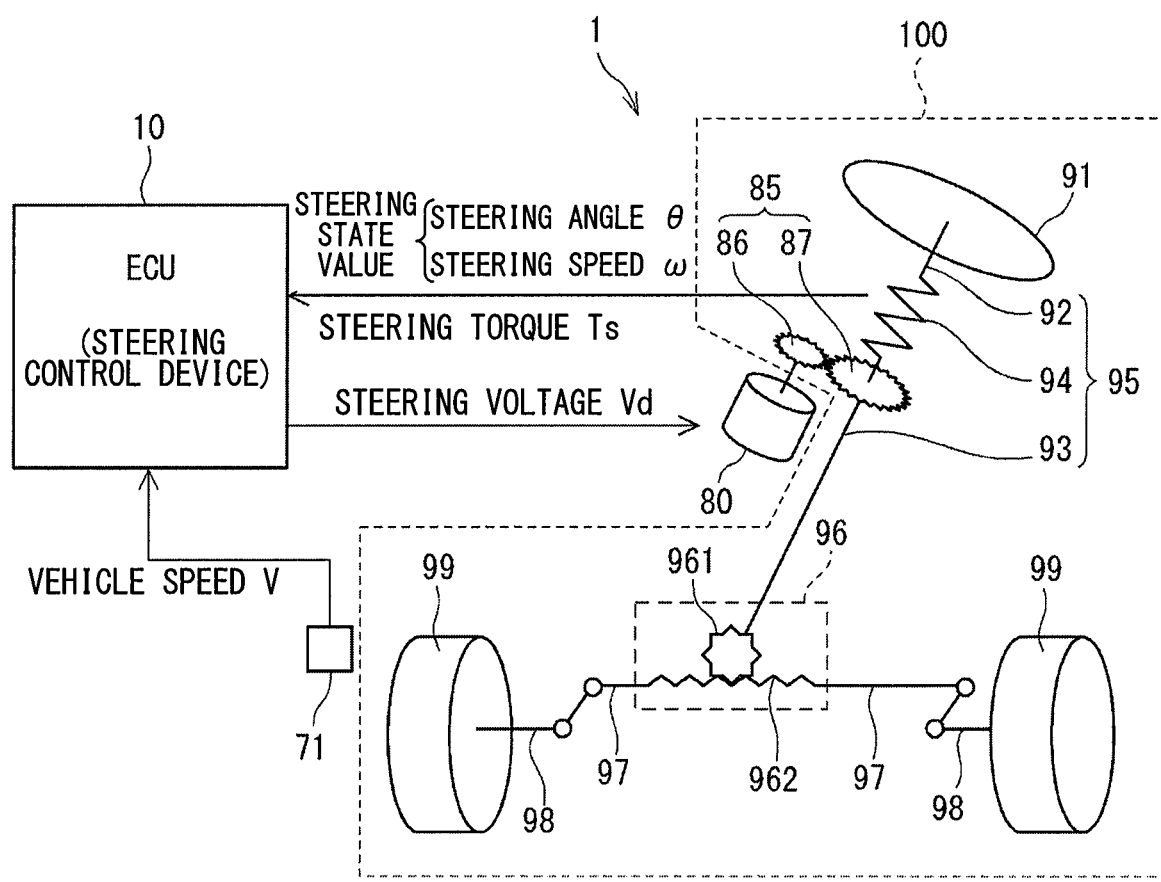
FIG. 1 is an overall schematic view of an electric power steering system.

A steering control device according to plural embodiments will be described with reference to the accompanying drawings. An electronic control unit (ECU) is provided as a steering control device for an electric power steering system of a vehicle to output an assist torque command to a motor, which generates a steering assist torque, in each embodiment. In the following embodiments, substantially same structural parts are depolarity signated with the same reference numerals thereby to simplify the description. The following first to fourth embodiments are collectively referred to as a present embodiment.

[Configuration of Electric Power Steering System]

As shown in FIG. 1, an electric power steering system 1 is configured to assist a driver's operation of a steering wheel 91 by using a driving torque of a motor 80.

The steering wheel 91 is fixed to one end of a steering shaft 92, and an intermediate shaft 93 is provided on the other end side of the steering shaft 92. The steering shaft 92 and the intermediate shaft 93 are coupled by a torsion bar of a torque sensor 94. These structural components provide a steering shaft assembly 95. The torque sensor 94 is provided to detect a steering torque Ts based on a torsion angle of the torsion bar.

A gear box 96 including a pinion gear 961 and a rack 962 is provided at an end portion of the intermediate shaft 93 opposite to the torque sensor 94. When a driver rotates the steering wheel 91, the pinion gear 961 rotates together with the intermediate shaft 93, and the rack 962 moves to right and left with the rotation of the pinion gear 961. Tie rods 97 are provided at both lateral ends of the rack 962 and coupled to tires (road wheels) 99 via knuckle arms 98. The tie rods 97 reciprocate right and left to pull and push the knuckle arms 98 and change the direction of the tires 99.

The motor 80 is, for example, a three-phase AC brushless motor, which outputs an assist torque for assisting a steering force of the steering wheel 91 in accordance with a drive voltage Vd outputted from the ECU 10. In case of the three-phase AC motor, the drive voltage Vd means each phase voltage of U phase, V phase and W phase. Rotation of the motor 80 is transmitted to the intermediate shaft 93 via a speed reduction mechanism 85, which is formed of a worm gear 86, a worm wheel 87 and the like. In addition, steering rotation of the steering wheel 91 and rotation of the intermediate shaft 93 caused by a reaction force from a road surface are transmitted to the motor 80 via the speed reduction mechanism 85.

The electric power steering system 1 shown in FIG. 1 is a column-assisted type in which the rotation of the motor 80 is transmitted to the steering shaft 95. However, the ECU 10 of the present embodiment may be applied to an electric power steering system of a rack assist type or to a steer-by-wire system in which a steering wheel and tires (road wheels) are mechanically separated. In another embodiment, a multi-phase AC motor other than three phases or a DC motor with brushes may be used as a steering assist motor.

Figure 2:
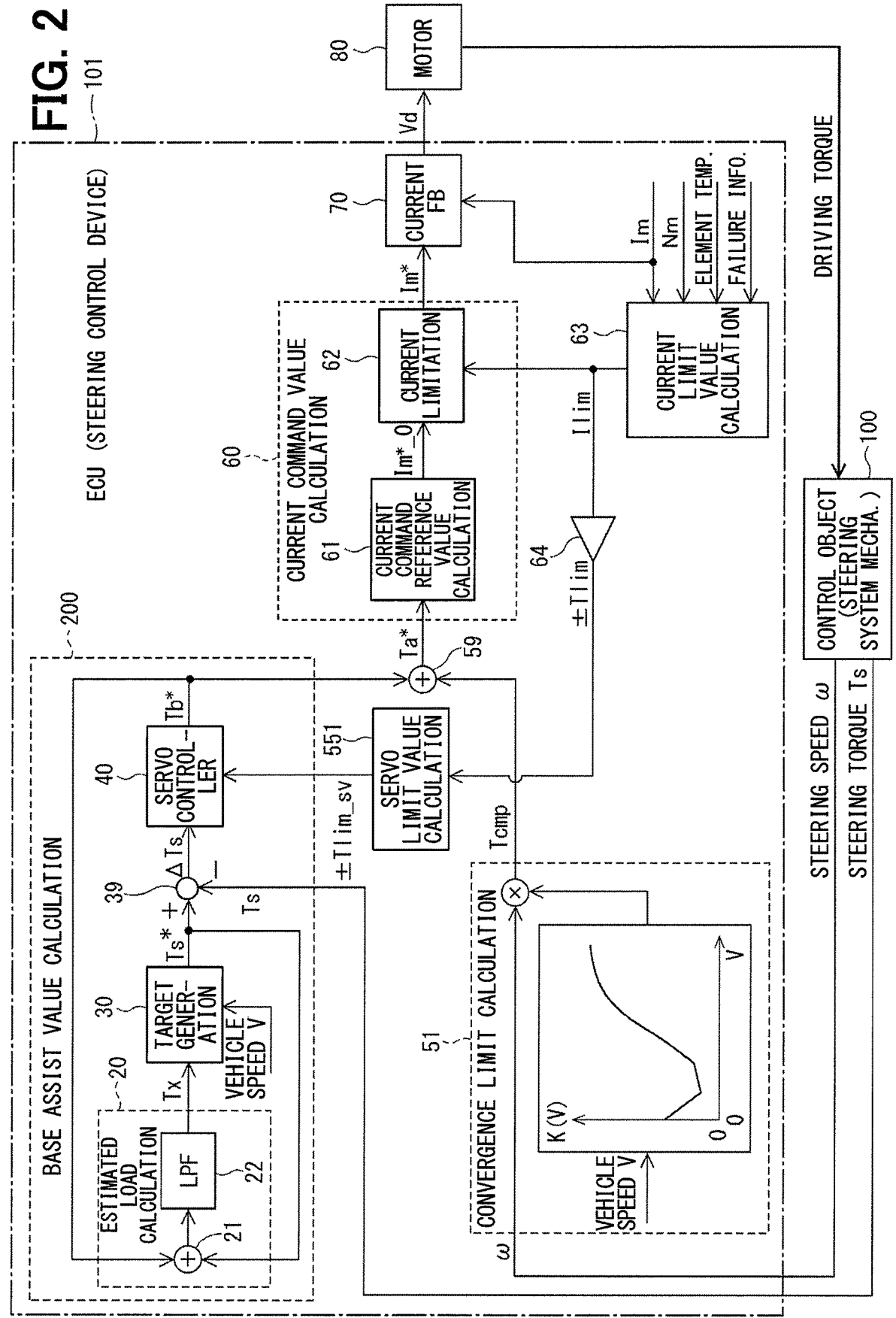
FIG. 2 is a block diagram of an ECU (steering control device) according to a first embodiment.

Here, the entire structure from the steering wheel 91 to the tires 99 to which the steering force of the steering wheel 91 is transmitted is referred to as a steering system mechanism 100. As shown in FIG. 1 and FIG. 2, the ECU 10 is provided to control the steering torque Ts generated by the steering system mechanism 100 by controlling a driving torque that the motor 80 outputs to the steering system mechanism 100. Further, the ECU 10 acquires information on a steering state value and the steering torque Ts, which are physical quantities reflecting a steering state from the steering system mechanism 100.

The steering state value includes a steering angle θ, a steering speed ω and the like. The steering angle θ is acquired from, for example, a sensor that detects rotation of the steering wheel 91 or the motor 80. The steering speed ω may be calculated by differentiating the steering angle θ or may be estimated as an estimated angular velocity which is calculated by dividing an induced voltage acquired from a current and a voltage of the motor 80 by a counter-electromotive voltage constant. Further, the ECU 10 is configured to acquire a vehicle speed V detected by a vehicle speed sensor 71 provided at a predetermined location of the vehicle.

The ECU 10 operates with electric power from an in-vehicle battery (not shown), and calculates an assist torque command value Ta* based on information such as steering state values like the steering angle θ and steering speed ω, the steering torque Ts, the vehicle speed V and the like. The ECU 10 is configured to cause the steering system mechanism 100, which is a control object to be controlled, to generate the steering torque Ts by applying the drive voltage Vd to the motor 80 based on the assist torque command value Ta*. Various control processing in the ECU 10 may be software processing of a program stored in a tangible memory device such as a ROM and executed by a CPU (central processor unit) of a computer, or may be hardware processing executed by discrete electronic circuits. Each processing whichever it is the software processing or the hardware processing, each function is shown as a functional unit configured to execute the intended function.

[Configuration and Operational Effect of ECU]

Hereinafter, configuration and operational effect of the ECU 10 of each embodiment will be described. The ECU of each embodiment is denoted with a reference numeral, which has the number of each embodiment in the third digit following preceding two-digit reference numeral 10. ECUs 101, 102 and 103 of the first to third embodiments each include a convergence control calculation unit 51 as a correction control calculation unit. An ECU 104 of the fourth embodiment includes an active return control unit 54 as the correction control calculation unit. In the convergence control, the steering speed ω is used as the steering state value. In an active return control, the steering angle θ is used as the steering state value. In addition, the ECU 10 of each embodiment has a different configuration of a servo limit value calculation unit which calculates an output limit value of a servo controller 40. The servo limit value calculation unit of each embodiment is denoted with a reference numeral, which has the number of each embodiment in the third digit following preceding two-digit reference numeral 55.

First Embodiment

The first embodiment will be described with reference to FIG. 2 to FIG. 4. As shown in FIG. 2, the ECU 101 of the first embodiment includes a base assist value calculation unit 200, a convergence control calculation unit 51, a current command value calculation unit 60, a current limit value calculation unit 63, a torque converter 64, a current feedback (FB) unit 70, a servo limit value calculation unit 551 and the like. The base assist value calculation unit 200 includes an estimated load calculation unit 20, a target generation unit 30, a deviation calculation unit 39 and a servo controller 40, and calculates a base assist value Tb*.

The estimated load calculation unit 20 includes an adder 21 and a low-pass filter (LPF) 22, and calculates an estimated load Tx. Alternatively, the load may be directly detected. In a configuration example shown in FIG. 2, the adder 21 adds the base assist torque Tb* and a target steering torque Ts*. Alternatively, the base assist value Tb* and the steering torque Ts may be added in the same manner as in the conventional configuration. The low-pass filter 22 extracts a frequency component of a band having a predetermined frequency, for example 10 Hz or lower, from the added torque outputted from the adder 21. The estimated load calculation unit 20 outputs the frequency component extracted by the low-pass filter 22 as the estimated load Tx.

The target generation unit 30 provided as a target steering torque calculation unit calculates the target steering torque Ts*, which is a target value of the steering torque Ts, based on the estimated load Tx and the vehicle speed V. A value determined by adding a steering angle reference target steering torque, which is calculated based on the steering angle θ, may be set as the target steering torque Ts*. The deviation calculation unit 39 calculates a torque deviation ΔTs (=Ts*−Ts), which is a difference between the steering torque Ts detected by the torque sensor 94 and the target steering torque Ts*.

The servo controller 40 executes servo control so that the torque deviation ΔTs is reduced toward 0, that is, the steering torque Ts follows the target steering torque Ts*, and calculates the base assist torque Tb*. The output of the servo controller 40 is limited by a servo limit value ±Tlim_sv calculated by the servo limit value calculation unit 551. Here, the output of the servo controller 40 and each torque calculation value in the ECU 101 are defined to be positive or negative in correspondence to a direction of steering. In order to indicate a relationship between each torque calculation value and limit value, the limit value is indicated with polarity signs of "+" and "−." As appropriate, a positive limit value and a negative limit value are described as an upper limit value and a lower limit value, respectively.

The convergence control calculation unit 51 calculates a correction control value Tcmp by convergence control for attenuating the assist torque in correspondence to the steering speed ω and the vehicle speed V. The convergence control is used for calculating the correction torque thereby to improve the convergence of the vehicle by reducing sudden return feeling when returning the steering wheel 91 while preventing the feeling of operating the steering wheel 91 from being impaired. For example, the correction control value Tcmp is calculated by multiplying the steering speed ω by a convergence gain K(V) determined from the vehicle speed V by referring to a map of data stored in a memory. The torque adder 59 outputs the assist torque command value Ta*, which is determined by adding the correction control value Tcmp to the base assist value Tb*, to the current command value calculation unit 60.

The current command value calculation unit 60 calculates a current command value Im* to be supplied to the motor 80 based on the assist torque command value Ta*. Specifically, the current command value Im* is interpreted as a command value of a motor current Im including a three-phase AC current and a dq-axis current in vector control. The current command value calculation unit 60 includes a current command reference value calculation unit 61 and a current limitation unit 62. The current command reference value Im*_0 calculated by the current command reference value calculation unit 61 is limited to the current limit value Ilim by the current limitation unit 62.

The current limit value calculation unit 63 calculates the current limit value Ilim based on the motor current Im, a motor rotation speed Nm, element temperature such as switching elements of an inverter or failure information such as short or open circuit failure of a drive circuit, and outputs it to the current limitation unit 62. A torque converter 64 converts the current limit value Ilim into a torque limit value ±Tlim, and outputs it to the servo limit value calculation unit 551.

The current feedback unit 70 applies the drive voltage Vd to the motor 80 so that the assist torque corresponding to the assist torque command value Ta* is applied particularly to a part of the steering shaft 95, which is on the tire 99 side from the torque sensor 94. Specifically, the current feedback unit 70 includes a current feedback control circuit, a drive circuit and a power conversion circuit such as an inverter, which are not shown.

The current feedback control circuit in the current feedback unit 70 calculates a voltage command value to be applied to each phase of the motor 80 based on the current command value Im* and the feedback current Im. The drive circuit commands a drive signal for switching operation of the inverter by PWM control or the like based on the voltage command value or the like. The inverter converts electric power inputted from a battery or the like by switching operation in response to the drive signal and outputs the drive voltage Vd so as to generate a desired assist torque on the steering shaft 95. Since the current feedback control exemplified above is known well in the field of motor control, no detailed description will be made.

Next, referring to FIG. 3, a detailed control configuration of the servo controller 40 will be described.

In one conventional servo control, PID control is executed by a control configuration exemplified below. A base assist command value Tb* is expressed by using the following equation (1) using a steering torque deviation ΔTs, a proportional gain Kp, an integral gain Ki, a differential gain Kd, a Laplace operator s and a transfer function D of a pseudo differential calculation.

$$Tb^* = Kp\Delta Ts + (Ki/s)Ki\Delta Ts + KdD\Delta Ts \tag{1}$$

In discretizing the equation (1) at a calculation cycle T, the following equation (2) of bilinear transformation is substituted into the equation (1).

$$s = (2z-1)/(Tz+1) \tag{2}$$

Further, assuming that a present value is represented by a subscript "n" and a previous value is represented by a subscript "n−1," the following equation (3) is acquired.

$$Tb^*_n = Kp(\Delta Ts_n - \Delta Ts_{n-1}) + (T/2)Ki(\Delta Ts_n + \Delta Ts_{n-1}) + Kd(D\Delta Ts_n - D\Delta Ts_{n-1}) + Tb^*_{n-1} \tag{3}$$

In the right side of the equation (3), the first term is a proportional term, the second term is an integral term, the third term is a differential term and the fourth term is a previous value of the output of the servo controller 40. Here, (T/2)Ki of the integral term is rewritten as Ki. FIG. 3 shows a configuration for limiting an absolute value by the servo limit value ±Tlim_sv after executing the addition of the equation (3) and storing it in the present value Tb*n.

Figure 3:
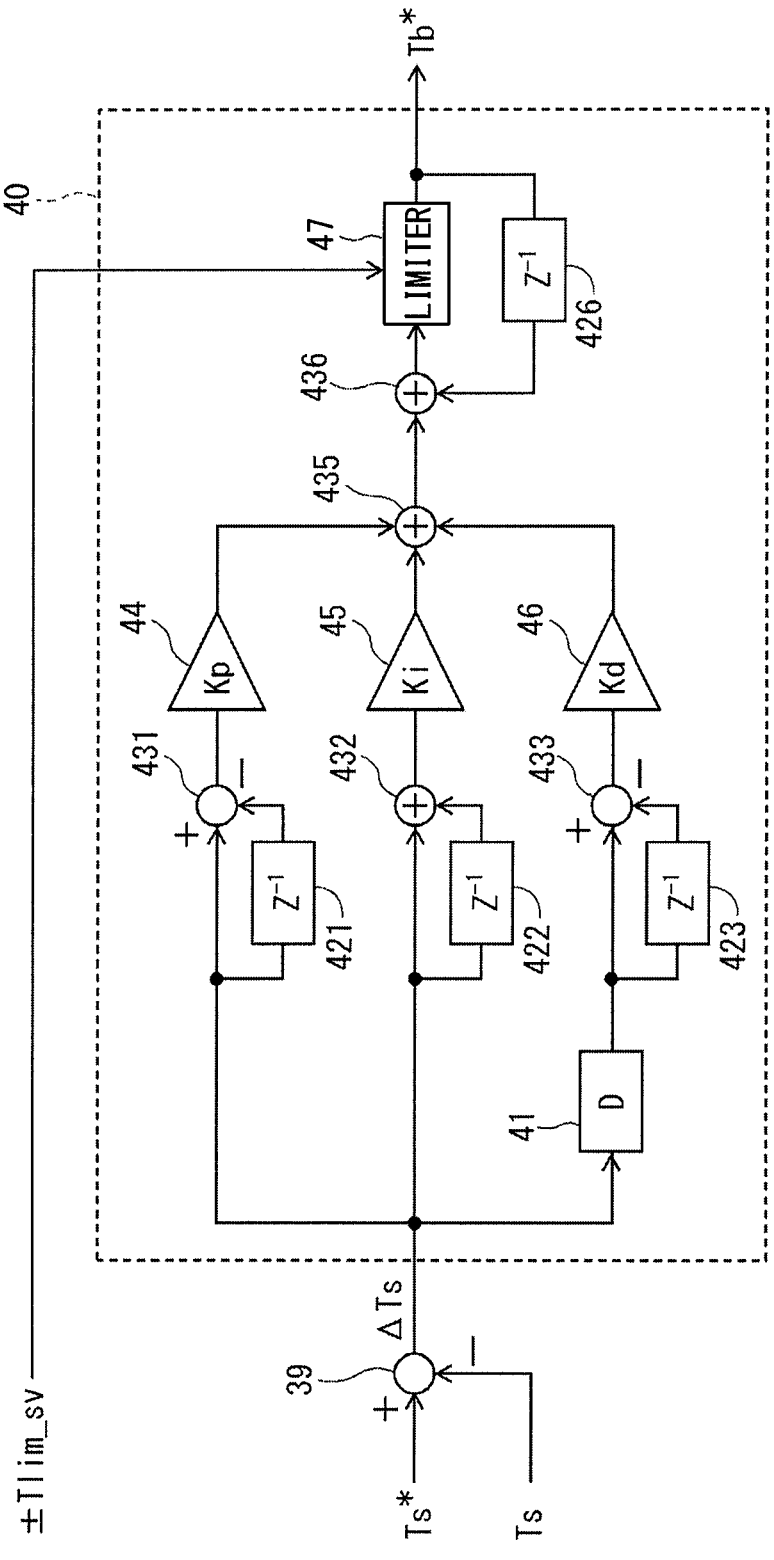
FIG. 3 is a block diagram of a servo controller according to the first embodiment.

In FIG. 3, the proportional term is calculated by a delay element 421, a subtractor 431 and a Kp multiplier 44. The integral term is calculated by a delay element 422, an adder 432 and a Ki multiplier 45. The differential term is calculated by a pseudo-differential calculator 41, a delay element 423, a subtractor 433 and a Kd multiplier 46.

The proportional term, the integral term and the differential term are added by an adder 435, and the previous value Tb*n−1 inputted through a delay element 426 is added by an adder 436. This addition result value is limited by the servo limit value ±Tlim_sv in an output limiter 46, and is output as the base assist command value Tb*. In this manner, in the configuration of FIG. 3, the value calculated by integrating the previous value Tb*n−1 of the output of the servo controller 40 is limited by the servo limit value ±Tlim_sv.

In FIG. 3, the delay element 422, the adder 432, the Ki multiplier 45, the delay element 426 and the adder 436 jointly configure an integrator. Also, the delay element 426 represents the previous value of the output, and the adder 436 represents the integrated value of the previous value. As a result of the servo calculation described above, the base assist command value Tb* is limited by the servo limit value ±Tlim_sv. When the polarity sign of the steering torque deviation ΔTs changes after the limitation is applied, it becomes immediately smaller than the limit value, so that the reset windup is suppressed.

Figure 16:
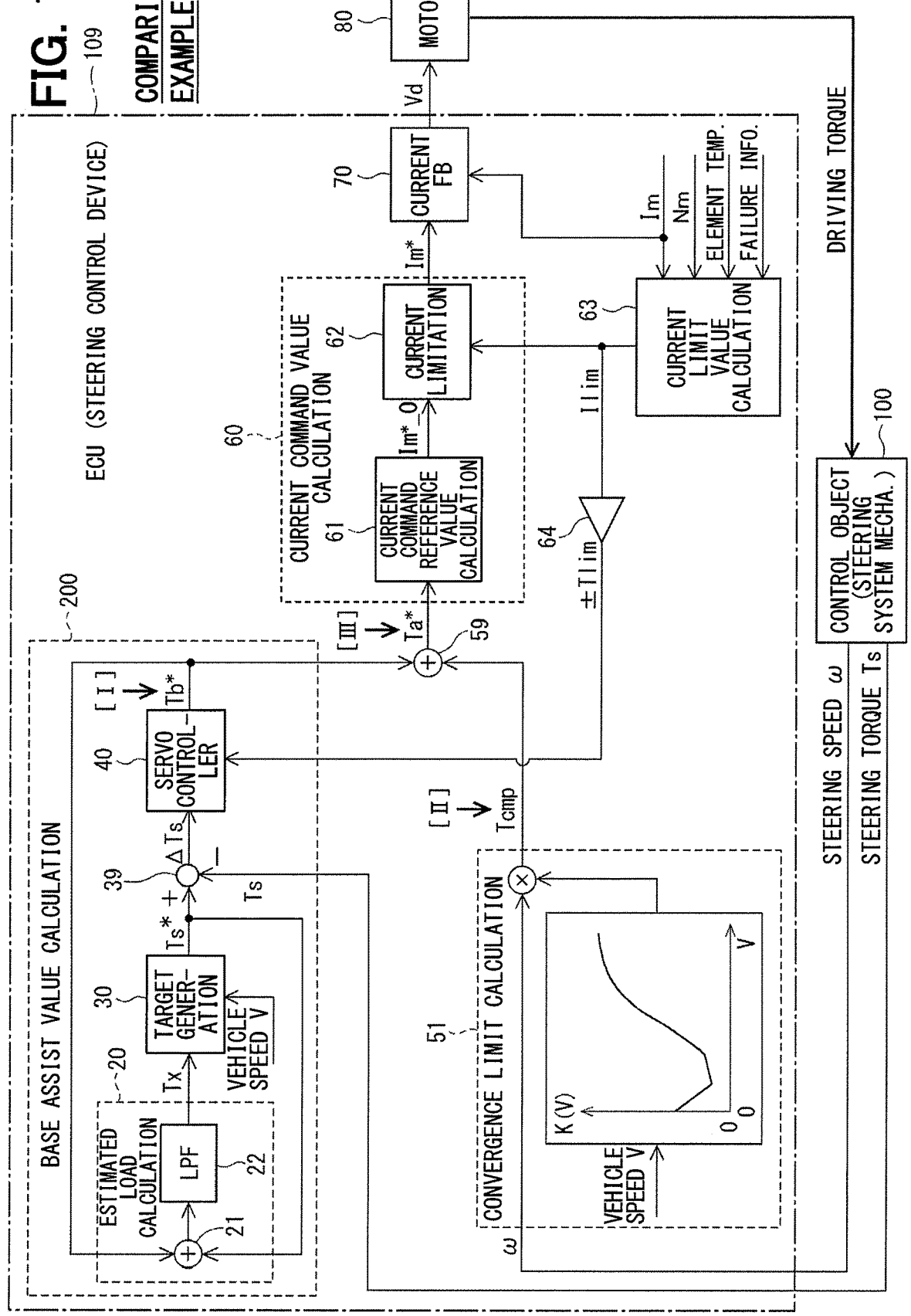
FIG. 16 is a block diagram of an ECU (steering control device) according to a comparison example.
Figure 17:
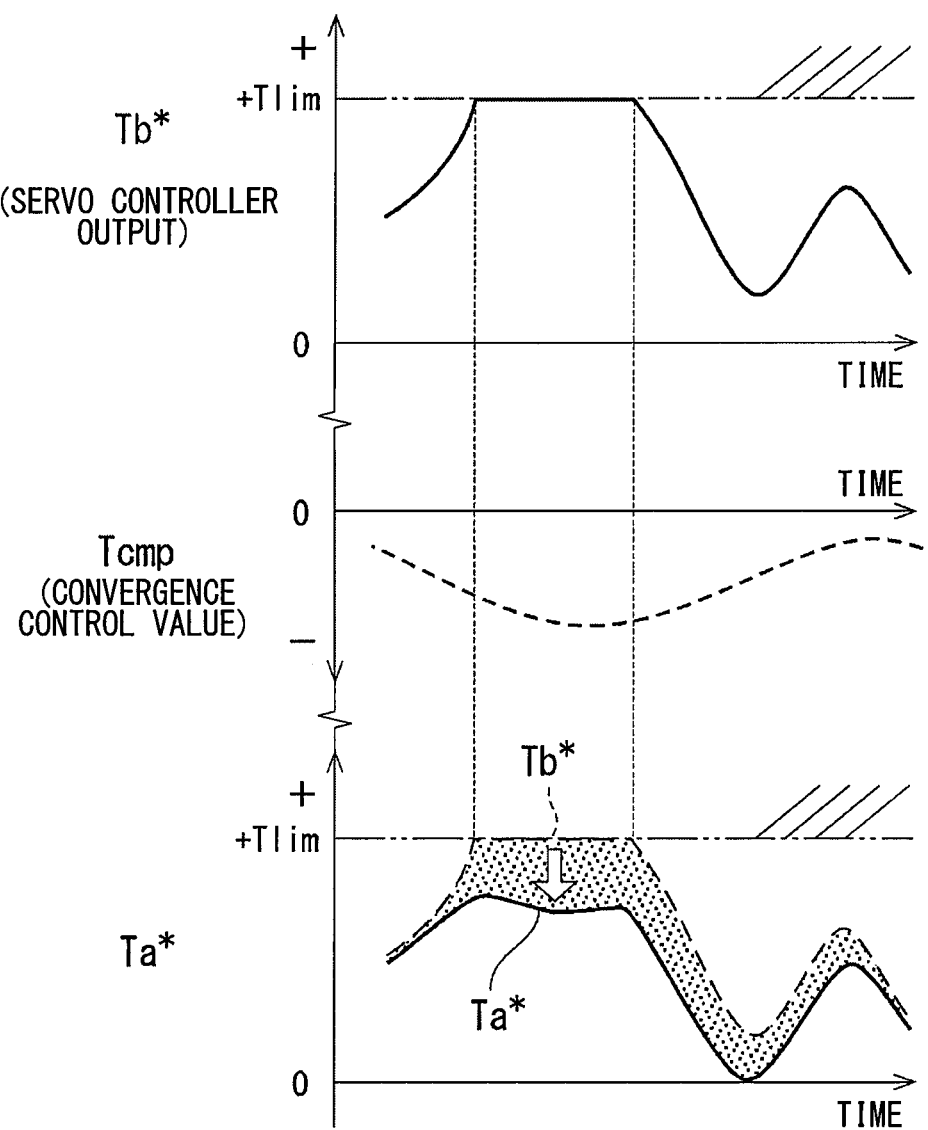
FIG. 17 is a time chart showing an example of a base assist value, a correction control value (convergence control value) and an assist torque command value in the comparison example.

In the present embodiment, the servo limit value ±Tim_sv calculated by the servo limit value calculation unit 551 is used as the output limit value of the servo controller 40. Here, comparison examples which are compared with the present embodiment will be described with reference to FIG. 16 to FIG. 19. As shown in FIG. 16, an ECU 109 of the comparison example does not include the servo limit value calculation unit 551, which is shown in FIG. 2. Therefore, the torque limit value ±Tlim converted from the current limit value Ilim by the torque converter 64 is directly input to the servo controller 40. The output of the servo controller 40 is simply limited by the torque limit value ±Tlim. Images of the base assist value Tb*, the correction control value Tcmp of the convergence control and the assist torque command value Ta*, which are indicated by arrows [I], [II] and [III] in FIG. 16, respectively, are shown in FIG. 17. Here, the steering torque and the correction control value Tcmp are shown as changing in the positive range and the negative range, respectively.

The base assist value Tb* which is the output of the servo controller 40 is limited by the torque limit value +Tlim converted from the current limit value Ilim. Since the negative correction control value Tcmp by the convergence control is added to the base assist value Tb*, the assist torque command value Ta* is smaller than the torque limit value +Tlim. That is, the output of the motor 80 based on the assist torque command value Ta* is suppressed to a value much smaller than the torque limit value +Tlim. That is, since the assist torque command value Ta* does not reach the torque limit value +Tlim, the motor 80 cannot generate the assist torque as much as possible within a range of the current limit value Ilim.

Figure 18:
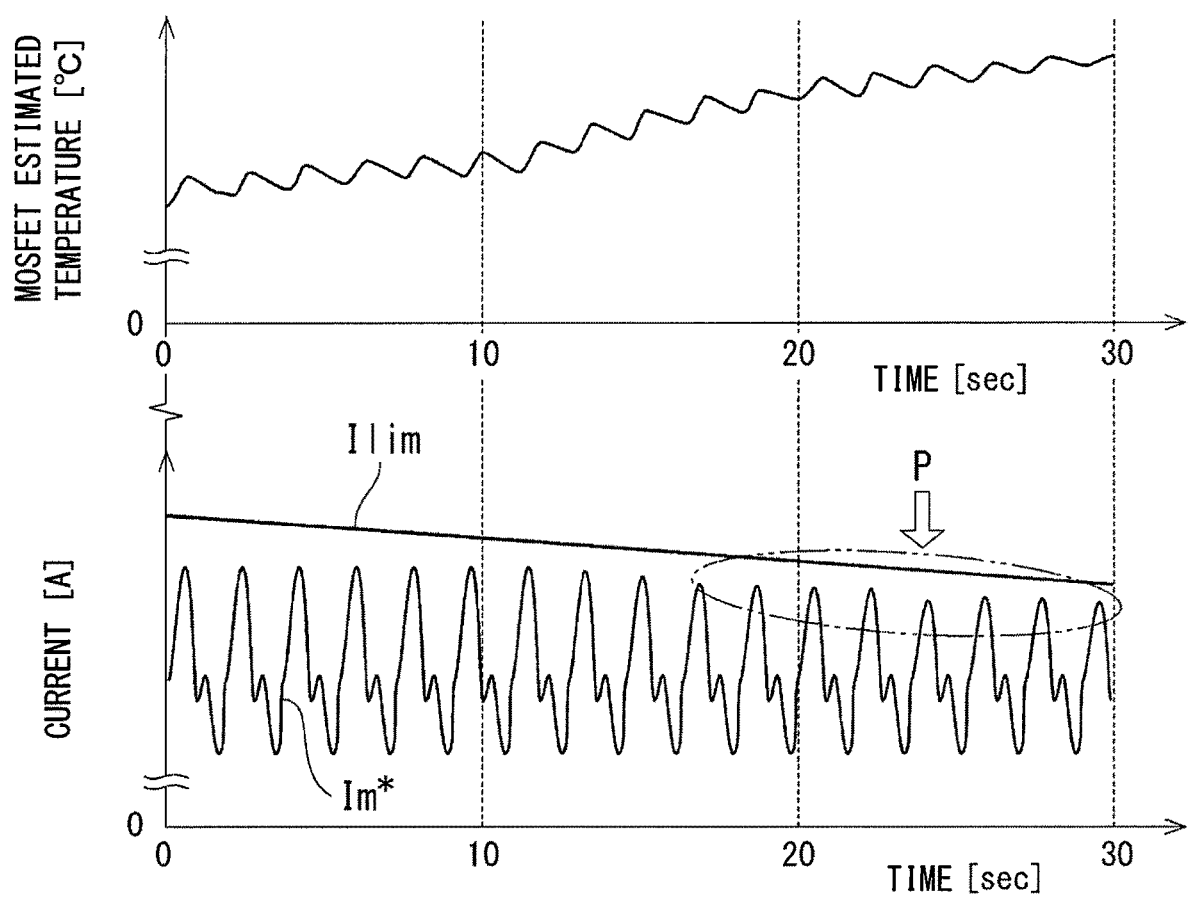
FIG. 18 is a time chart showing a change in a current limit value during a high-load continuous steering operation.

FIG. 18 shows a current command value Im*, a current limit value Ilim and an estimated temperature change of MOSFETs, which are switching elements of the inverter, in case that the steering wheel is repeatedly steered between the steering angles 360 degrees and 405 degrees at the time of high load continuous steering, specifically, turning the steering wheel left and right without moving the vehicle. Such steering is assumed, for example, in a situation where the steering wheel is repeatedly turned left and right at the time of pulling a vehicle into a garage. In FIG. 18, [° C.] and [A] in the vertical axis do not mean as numerical units but are for expressing dimensions of physical quantities. This also applies to FIG. 10 referred to later.

Figure 19:
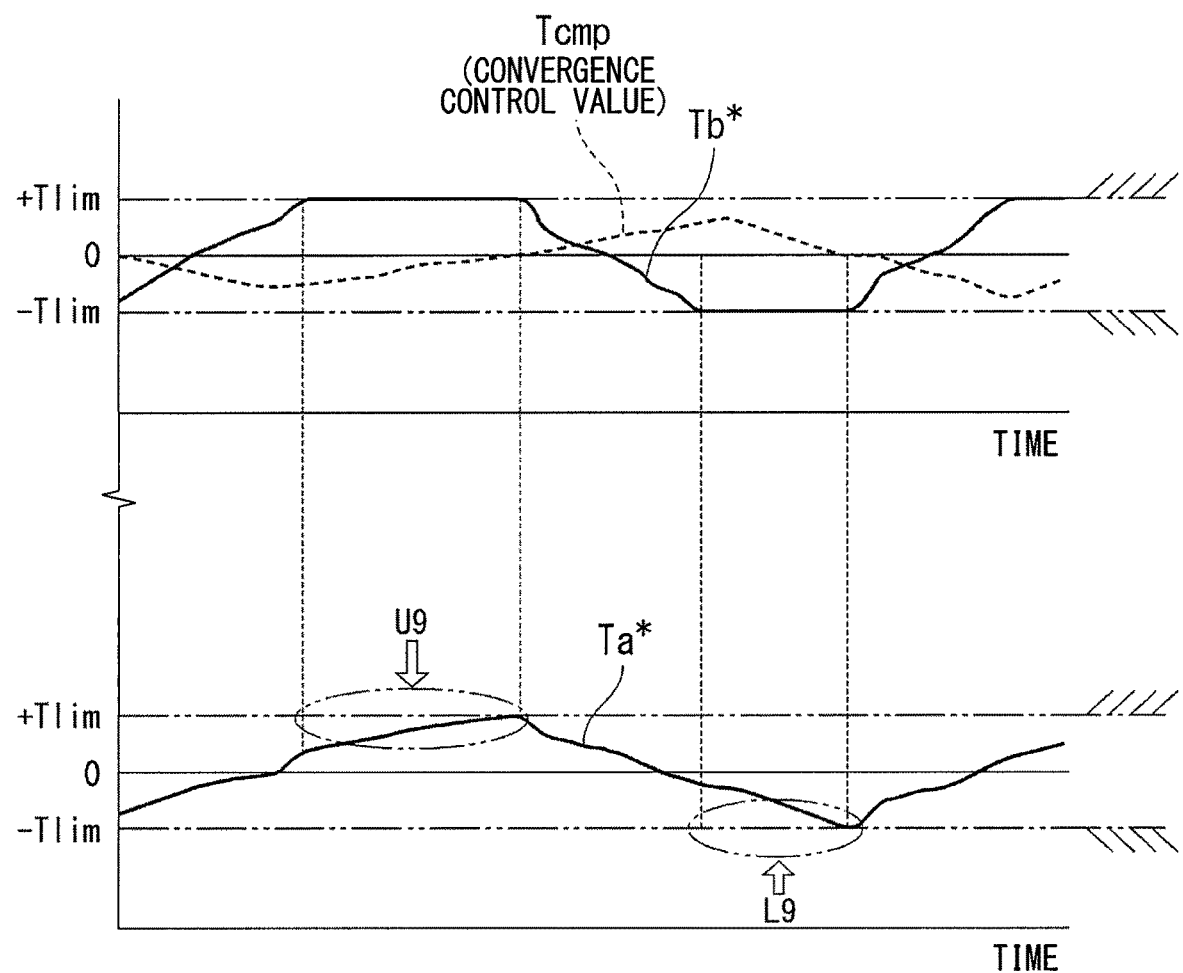
FIG. 19 is a time chart of each calculated value data in an actual vehicle running in the comparison example.

When the motor 80 is continuously supplied with current and the MOSFET estimated temperature gradually increases, the current limit value calculation unit 63 decreases the current limit value Ilim as indicated by P in order to protect switching elements such as MOSFETs from overheating. In this way, when quick cut-in steering is performed with the decreased current limit value Ilim due to overheat protection and failure in the motor drive control system, the steering force based on the assist torque command value Ta* to which the correction control value Tcmp is added provides strong viscous feel and makes the steering operation heavy. FIG. 19 shows time change data of each calculation value under control of the comparison example when the steering is performed to the left and right with a frequency of slightly higher than 1 Hz while limiting the current to a predetermined limit value (for example, 20 A) in actually moving a vehicle. In the upper half of FIG. 19, the base assist value Tb* which is the output of the servo controller 40 is indicated by a solid line, and the correction control value Tcmp of the convergence control is indicated by a broken line. In the lower half of the figure, the assist torque command value Ta* determined by adding the correction control value Tcmp to the base assist command value Tb* is indicated by a solid line. In addition, the torque limit value ±Tlim is indicated by a two-dot chain line in both of the upper and lower halves of the figure. Hereinafter, in FIG. 4, FIG. 9 and FIG. 13 referred to in the description of the first to third embodiments, test conditions in actually moving a vehicle and each calculated value are indicated in the similar manner as in the comparison example of FIG. 19 except that the servo limit value ±Tlim_sv is additionally indicated by a one-dot chain line.

In the comparison example, the output of the servo controller 40 is limited by the torque limit value ±Tlim itself. Therefore, in two situations U9 and L9 indicated with the ellipse marks, the assist torque command value Ta* does not reach the torque limit value ±Tlim or is difficult to reach in most of the period except for time which is immediately before reversal of the polarity sign of the correction control value Tcmp. As a result, the absolute assist torque becomes insufficient and the steering angle θ becomes small, when a driver steers the steering wheel within a torque range which the driver feels lighter than a certain load level. That is, in this case, steering the steering wheel 91 up to a predetermined steering angle θ becomes heavy. This phenomenon will be described later with reference to a Lissajous waveform diagram of FIG. 10 in the description of a second embodiment.

In order to solve the above-described problem in the comparison example, the ECU 101 of the first embodiment shown in FIG. 2 includes the servo limit value calculation unit 551. The servo limit value calculation unit 551 calculates the servo limit value ±Tlim_sv to compensate for a decrease in an absolute value of the base assist command value Tb*, which is caused by addition of the correction control value Tcmp, and outputs it to the servo controller 40.

In all the embodiments, the servo limit value calculation unit 551 determines the servo limit value ±Tlim_sv based on the torque limit value ±Tlim. In addition, the servo limit value calculation unit 551 of the first embodiment adds a value, which is determined by adding a predetermined positive enlargement value α (>0) to an absolute value |Tlim| of the torque limit value, as the absolute value |Tlim_sv|. The enlargement value α is set to a positive value which corresponds to a maximum gain of the convergence control, for example.

As understood well, the output of the servo controller 40 is limited by the limit torque of the same direction as the steering direction. That is, the polarity sign of the servo limit value ±Tlim_sv is set to coincide with the polarity sign of the torque limit value ±Tlim.

In the first embodiment, the servo limit value ±Tlim_sv is calculated by uniformly multiplying the absolute value |Tlim| of the torque limit value by the enlargement value α irrespective of the values of the steering speed ω and the correction control value Tcmp, that is, in the entire region of the steering speed ω and the correction control value Tcmp. More specifically, by the equations (4), the servo limit value calculation unit 551 sets, as the upper limit value +Tlim_sv of the servo limit value, the value determined by adding the enlargement value α to the upper limit value +Tlim of the torque limit value, and sets as the lower limit value −Tlim_sv of the servo limit value, the value determined by subtracting the enlargement value α from the lower limit value −Tlim of the torque limit value.

$$+Tlim\_sv = +Tlim + \alpha$$

$$-Tlim\_sv = -Tlim - \alpha \quad (4)$$

Figure 4:
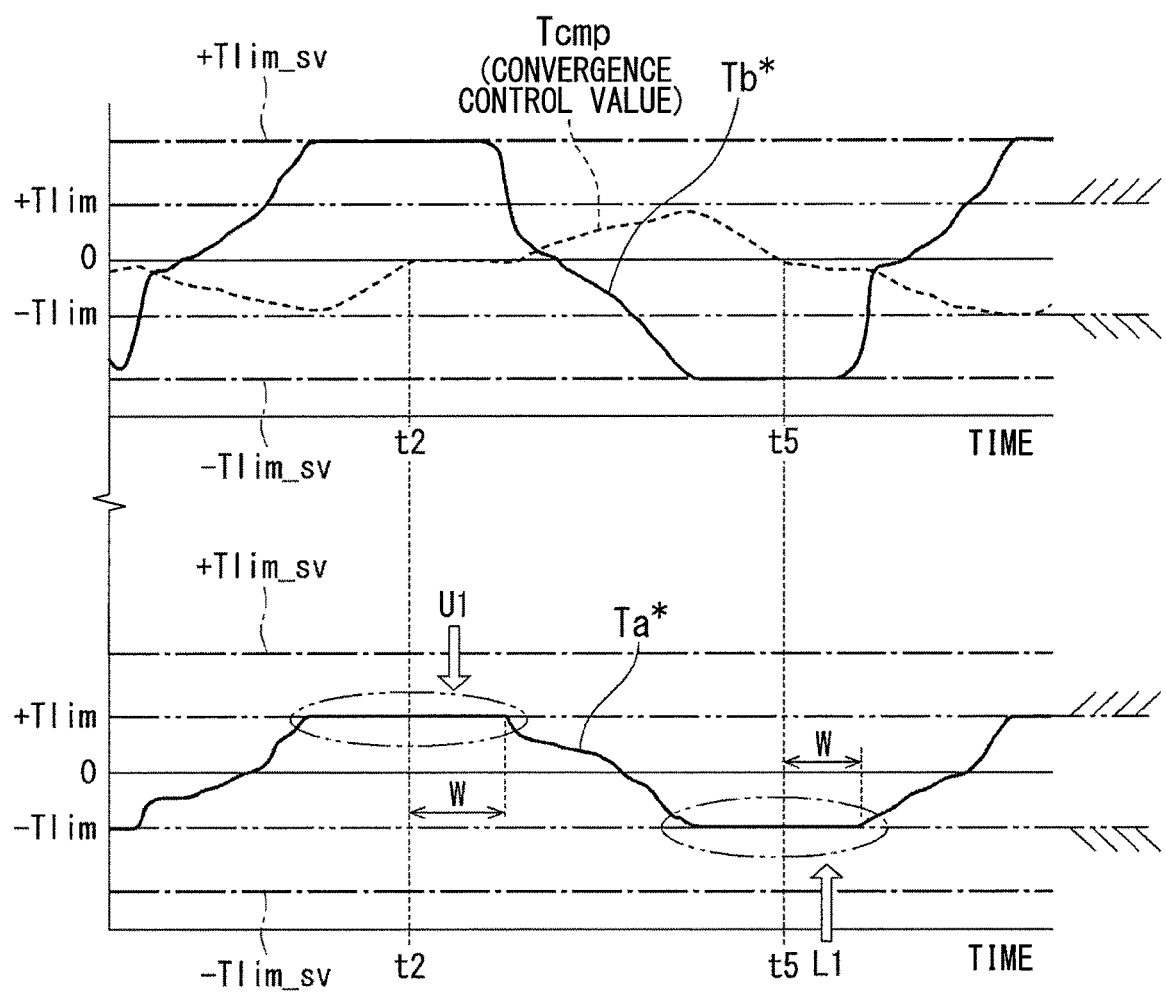
FIG. 4 is a time chart of each calculated value data in an actual vehicle running in the first embodiment.

FIG. 4 shows each calculation value data in actually moving a vehicle under the control of the first embodiment.

By setting the range of the servo limit value ±Tlim_sv wider by the enlargement value α for upper and lower limits with respect to the range of the torque limit value ±Tlim, the base assist value Tb* outputted from the servo controller 40 is variable in the range wider than that of the torque limit value ±Tlim. Therefore, the assist torque command value Ta* determined by adding the correction control value Tcmp to the base assist value Tb* reaches the torque limit value ±Tlim over a continuous period. It is to be understood that the assist torque command value Ta* reaches the torque limit value ±Tlim in situations U1 and L1 surrounded by ellipse marks. Times t2 and t5 and a period W shown in FIG. 4 will be described later in the description of FIG. 8 and FIG. 9 of the second embodiment.

The ECU 101 of the first embodiment can set the assist torque command value Ta* closely to the torque limit value ±Tlim corresponding to the current limit value Ilim by setting the absolute value |Tlim_sv| of the servo limit value to be larger than the absolute value |Tlim| of the torque limit value. The difference between the absolute value |Tlim_sv| of the servo limit value and the absolute value |Tlim| of the torque limit value is the value that compensates for the decrease in the absolute value of the base assist command value Tb* caused by addition of the correction control value Tcmp. As a result, the ECU 101 can cause the assist torque command value Ta* to reach the torque limit value ±Tlim corresponding to the current limit value Ilim.

As described above, the ECU 101 can drive the motor 80 to generate the maximum assist torque within the range of the current limit value Ilim during the cut-in steering operation in the configuration, in which the absolute value of the base assist command value Tb* is decreased by the correction control value Tcmp of the convergence control. Therefore, the steering feel of the driver improves.

Second Embodiment

Figure 5:
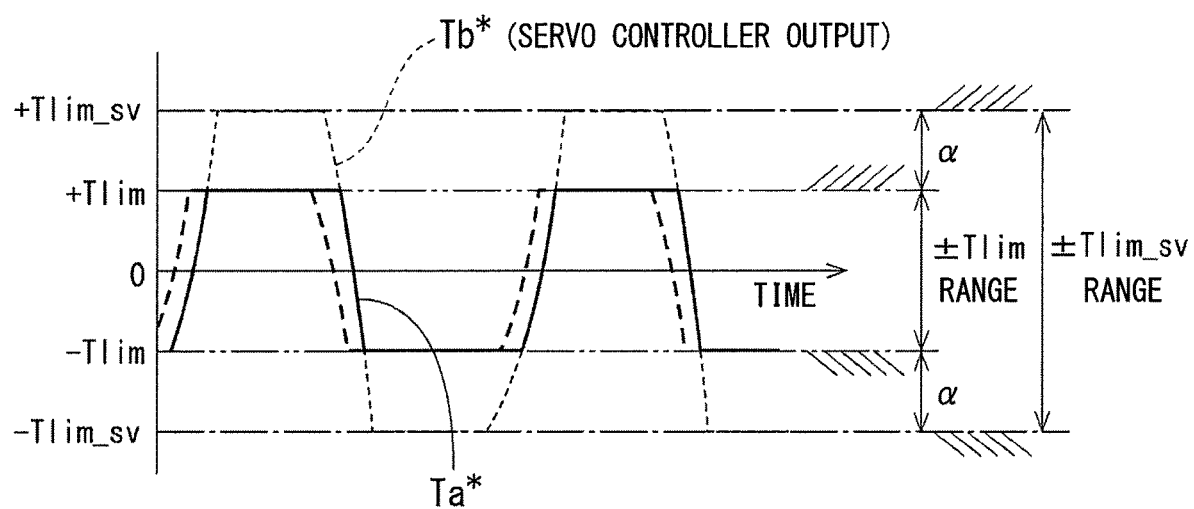
FIG. 5 is a time chart an improvement point from the first embodiment in a second embodiment.

The second embodiment will be described with reference to FIG. 5 to FIG. 10. First, with reference to FIG. 5, points for improvement on the first embodiment will be described. In FIG. 5, a thin broken line shows the base assist value Tb* output from the servo controller 40, a thick broken line shows an ideal image of the assist torque command value Ta* and a thick solid line shows the assist torque command value Ta* actually calculated. In the first embodiment, the absolute value |Tlim_sv| of the servo limit value is set by uniformly adding the enlargement value α to the absolute value |Tlim| of the torque limit value. Here, the servo limit value ±Tlim_sv exceeding the range of the torque limit value ±Tlim is the windup value by the servo controller 40.

If the windup value is large, even when the polarity sign of the steering torque deviation ΔTs (=Ts*−Ts) which is the input to the servo controller 40 changes, it takes time for the absolute value of the base assist value Tb* to become smaller than the torque limit value ±Tlim. Therefore, a follow-up delay of the assist torque command value Ta* occurs. As a result, it is likely that a driver will feel as getting caught (non-smoothness) in the steering operation as will be described later with reference to the Lissajous waveform diagram of FIG. 10.

Figure 6:
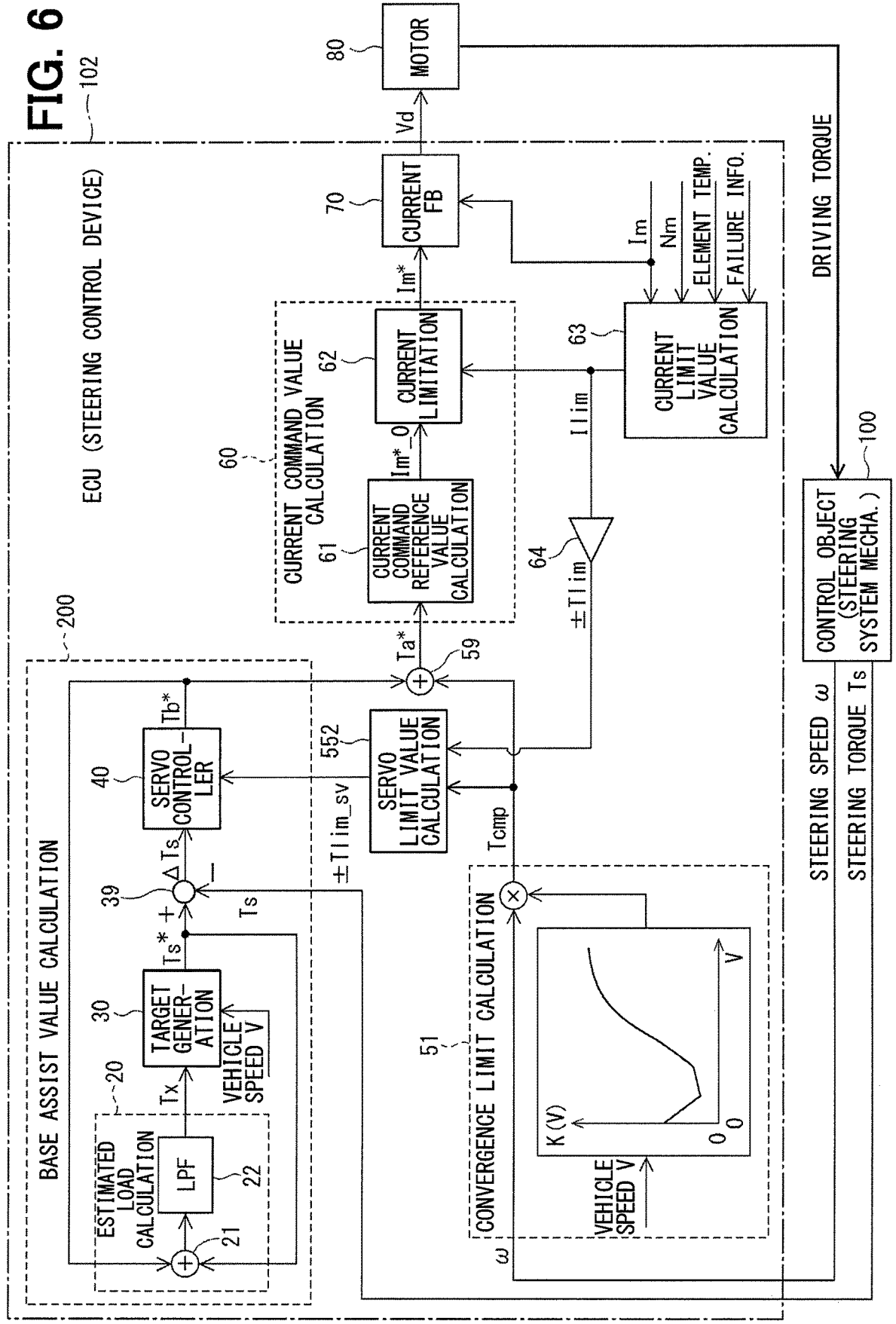
FIG. 6 is a block diagram of an ECU (steering control device) according to a second embodiment.

Therefore, in the second embodiment, the calculation configuration of the servo limit value ±Tlim_sv is improved in order to reduce the windup value and eliminate the feeling of getting caught (non-smoothness). As shown in FIG. 6, in an ECU 102 of the second embodiment, a servo limit value calculation unit 552 calculates the servo limit value ±Tlim_sv based on the torque limit value ±Tlim and the correction control value Tcmp output from the convergence control calculation unit 51. Specifically, the servo limit value calculation unit 552 calculates the servo limit value ±Tlim_sv by using the following equations (5).

$$+Tlim\_sv = \text{GUARD}(+Tlim-Tcmp, +Tlim+\alpha, +Tlim)$$

$$-Tlim\_sv = \text{GUARD}(-Tlim-Tcmp, -Tlim, -Tlim-\alpha) \quad (5)$$

In the equations (5), GUARD (A, US, LB) represents a function which limits an input polarity signal A to be equal to or smaller than UB and equal to or larger than LB. The enlargement value α is a regulation value for preventing the servo limit value ±Tlim_sv from being excessively enlarged, and is set to a positive value corresponding to the maximum gain of the convergence control, for example. That is, by setting the enlargement value α near the limit of a torque fluctuation range which is normally assumed, it is possible to prevent the base assist command value Tb* from being restricted by an abnormal limit value when an abnormality occurs in a calculation system.

Figure 7:
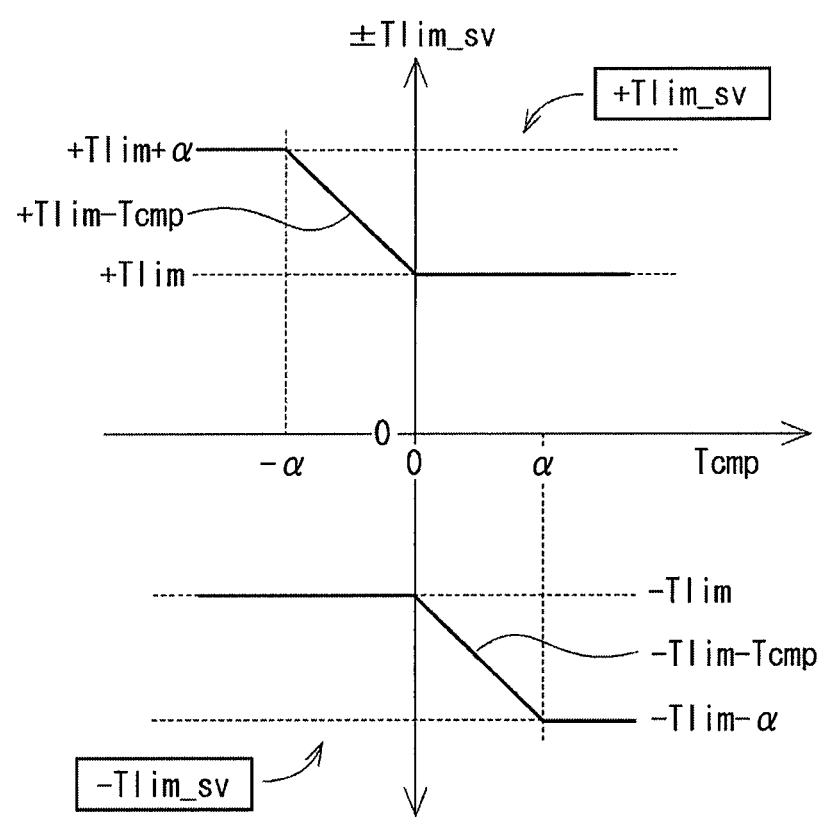
FIG. 7 is a graph showing a relationship between a correction control value and a servo limit value in the second embodiment.

A relationship between the correction control value Tcmp and the servo limit value ±Tlim_sv according to the equation (5) is shown in FIG. 7. The upper limit value of the servo limit value +Tlim_sv is a maximum value of a value (+Tlim+α) determined by adding the enlargement value α to the upper limit value of the torque limit value in a region of "Tcm≤−α", and is a minimum value of the upper limit value +Tlim of the torque limit value in a region of "0≤Tcmp." In addition, the upper limit value +Tlim_sv of the servo limit value is calculated as a value (+Tlim−Tcmp) determined by subtracting the correction control value Tcmp from the upper limit value +Tlim of the torque limit value in a region of "−α<Tcmp<0."

The lower limit value −Tlim_sv of the servo limit value is a minimum value of a value (−Tlim−α) determined by subtracting the enlargement value α from the lower limit value of the torque limit value in a region of "Tcmp≤−α", and is a maximum value of the lower limit value −Tlim of the torque limit value in a region of "0≤Tcmp." In addition, the lower limit value −Tlim_sv of the servo limit value is calculated as a value (−Tlim−Tcmp) determined by subtracting the correction control value Tcmp from the lower limit value −Tlim of the torque limit value in a region of "0<Tcmp<α."

In summary, the servo limit value calculation unit 552 sets the absolute value |Tlim_sv| of the servo limit value to be equal to or larger than the absolute value |Tlim| of the torque limit value and to be equal to or smaller than a value (|Tlim|+α) determined by adding the enlargement value α to the absolute value of the torque limit value. Furthermore, the servo limit value calculation unit 552 of the second embodiment calculates, as the servo limit value ±Tlim_sv, a value (±Tlim−Tcmp) determined by subtracting the correction control value Tcmp from the limit value with respect to the upper limit value +Tlim_sv when the correction control value Tcmp is a negative value and with respect to the lower limit value when the correction control value Tcmp is a positive value.

That is, the servo limit value calculation unit 552 calculates the servo limit value ±Tlim_sv in such a manner that the absolute value |Tlim_sv| of the servo limit value becomes larger than the absolute value |Tlim| of the torque limit value in a part of a region of the correction control value Tcmp. Therefore, the assist torque command value Ta* determined by adding the correction control value Tcmp to the base assist value Tb* can reach the torque limit value ±Tlim. In this example, the servo limit value ±Tlim_sv has a linear correlation with a slope of −1 with respect to the correction control value Tcmp. However, the servo limit value ±Tlim_sv may have a different linear correlation with a slope of other than −1 or a non-linear correlation by weighting or the like.

Figure 8:
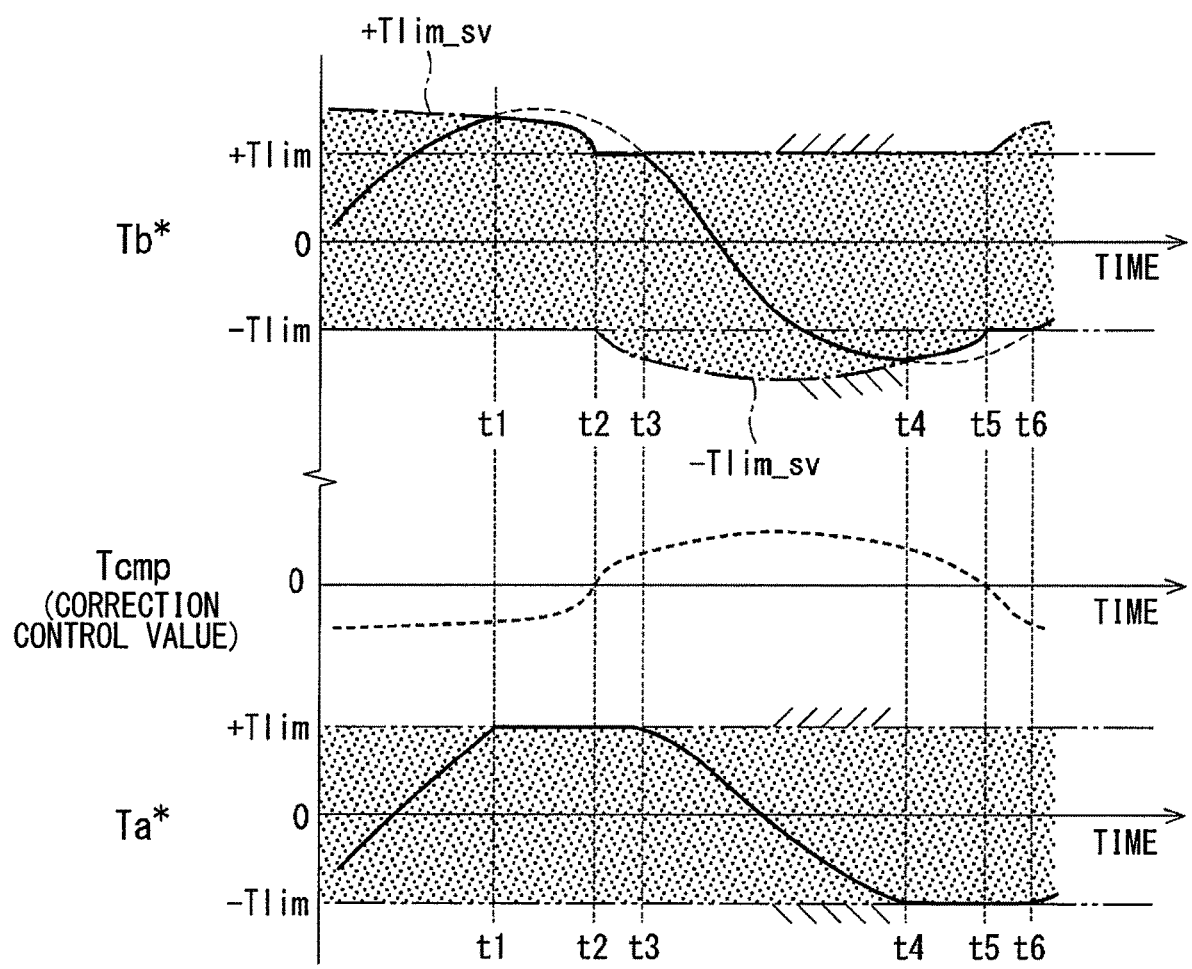
FIG. 8 is a time chart of output limitation of a servo controller in the second embodiment.

FIG. 8 schematically shows examples of calculation values of the base assist value Tb*, the correction control value Tcmp of the convergence control and the assist torque command value Ta* in the second embodiment. Shaded portions represent ranges that the base assist value Tb* and the assist torque command value Ta* can take. Here, it is assumed that the assist torque command value Ta* reaches the torque limit value ±Tlim in the vicinity of a peak of the base assist value Tb* at time t1, t4, and the polarity sign of the correction control value Tcmp changes and returns at time t2, t5.

Before the time t2, the upper limit value +Tlim_sv of the servo limit value exceeds the upper limit value +Tlim of the torque limit value because the negative correction control value Tcmp is subtracted from the upper limit value +Tlim of the torque limit value. In a period from time t2 to time t5, the lower limit value −Tlim_sv of the servo limit value is lower than the lower limit value −Tlim of the torque limit value because the positive correction control value Tcmp is subtracted from the lower limit value −Tlim of the torque limit value.

After time t2, the upper limit value +Tlim_sv of the servo limit value +Tlim_sv is maintained at the upper limit value +Tlim of the torque limit value until time t3 when the base assist value Tb* becomes equal to or smaller than the upper limit value +Tlim of the torque limit value. Therefore, when the state is changed to the return state at time t2, the windup value is reduced by the servo calculation generally executed from the torque limit value +Tlim. This also applies to a period from time t5 to time t6. Thus, the follow-up delay of the assist torque command value Ta* is prevented.

Figure 9:
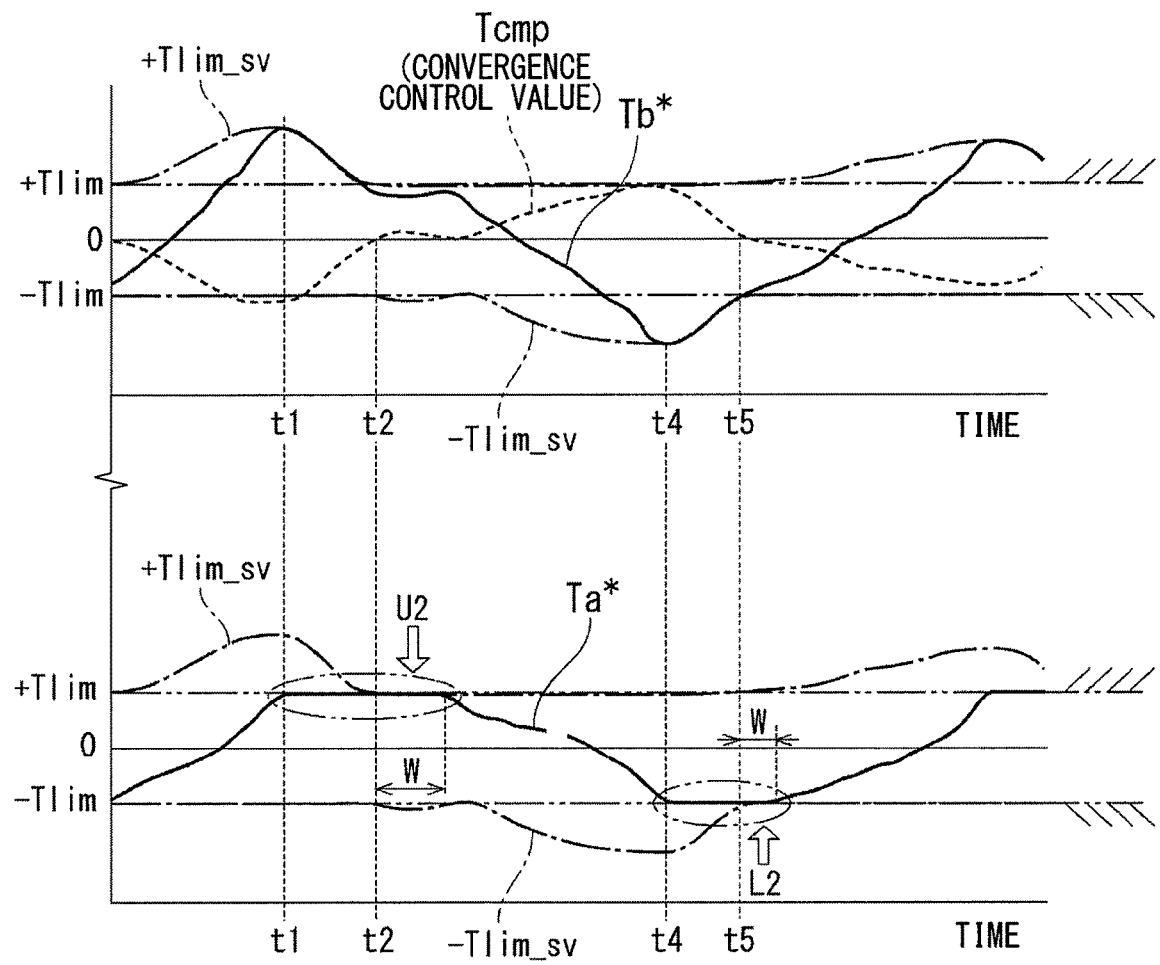
FIG. 9 is a time chart of each calculated value data in an actual vehicle running in the second embodiment.

In FIG. 9, each calculation value data in actually moving a vehicle under the control of the second embodiment is shown. Times t1, t2, t4 and t5 in FIG. 9 correspond to those of FIG. 8. The servo limit value ±Tlim_sv coincides with the base assist value Tb* within a range exceeding the torque limit value ±Tlim during periods from time t1 to time t2 and from time t4 to time t5. It is to be understood that the assist torque command value Ta* reaches the torque limit value ±Tlim in situations U2 and L2 surrounded by ellipse marks. Further, the periods W during which the assist torque command value Ta* coincide with the torque limit value ±Tlim from time t2 and time t5, that is, the periods during which the windup occurs, are shortened in comparison to the first embodiment shown in FIG. 4.

Figure 10:
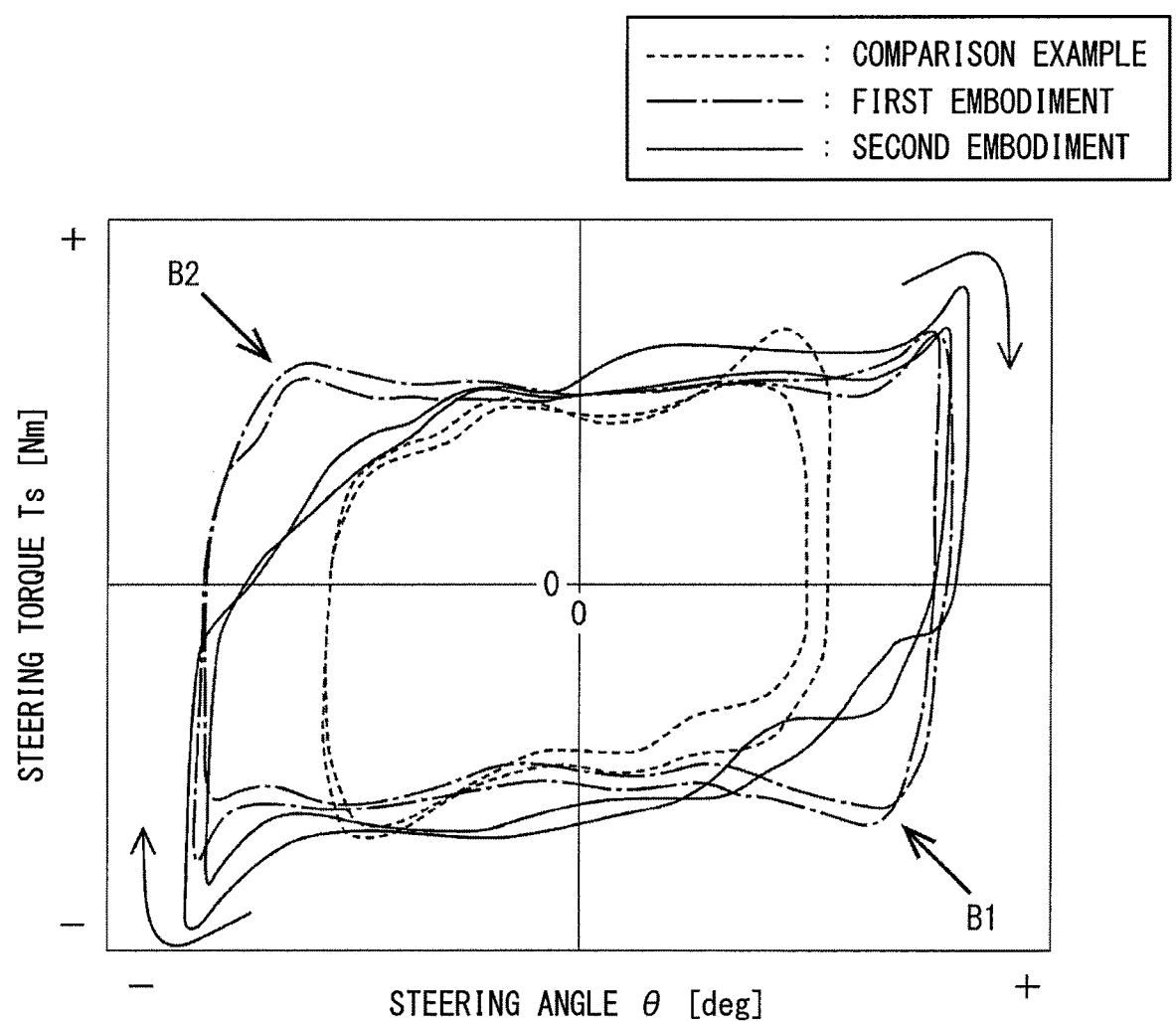
FIG. 10 is a Lissajous waveform diagram showing steering characteristics of a comparison example, the first embodiment and the second embodiment.

FIG. 10 shows a Lissajous waveform diagram of the steering angle θ and the steering torque Ts provided under a test condition of "steering without driving, current limit 20 A and steering frequency 1.3 Hz." A broken line, a one-dot chain line and a solid line indicate waveforms in the comparison example, the first embodiment and the second embodiment, respectively. In the comparison example, the steering angle θ at the time of steering in the left and right directions becomes relatively small since the motor 80 operates with a current smaller than the current limit value Ilim.

In the waveform of the first embodiment, the steering angle θ is larger than that of the comparison example. In this case, the steering wheel 91 can be more largely operated when steering is performed within a torque range that the driver feels as being less loaded. However, as indicated in portions B1 and B2, the steering torque Ts that has been reversed in polarity sign in the returning process of decreasing the steering angle θ becomes large because of the windup. Therefore, it is likely that the driver feels stuck, that is, non-smoothness in steering the steering wheel. In the waveform of the second embodiment, in addition to the steering angle θ being larger than that of the comparison example, the steering torque Ts is smoothly decreased as the steering angle θ is decreased at the time of turning back the steering wheel. Thus, it is possible to perform good steering without feeling of getting caught or stuck.

Third Embodiment

Figure 11:
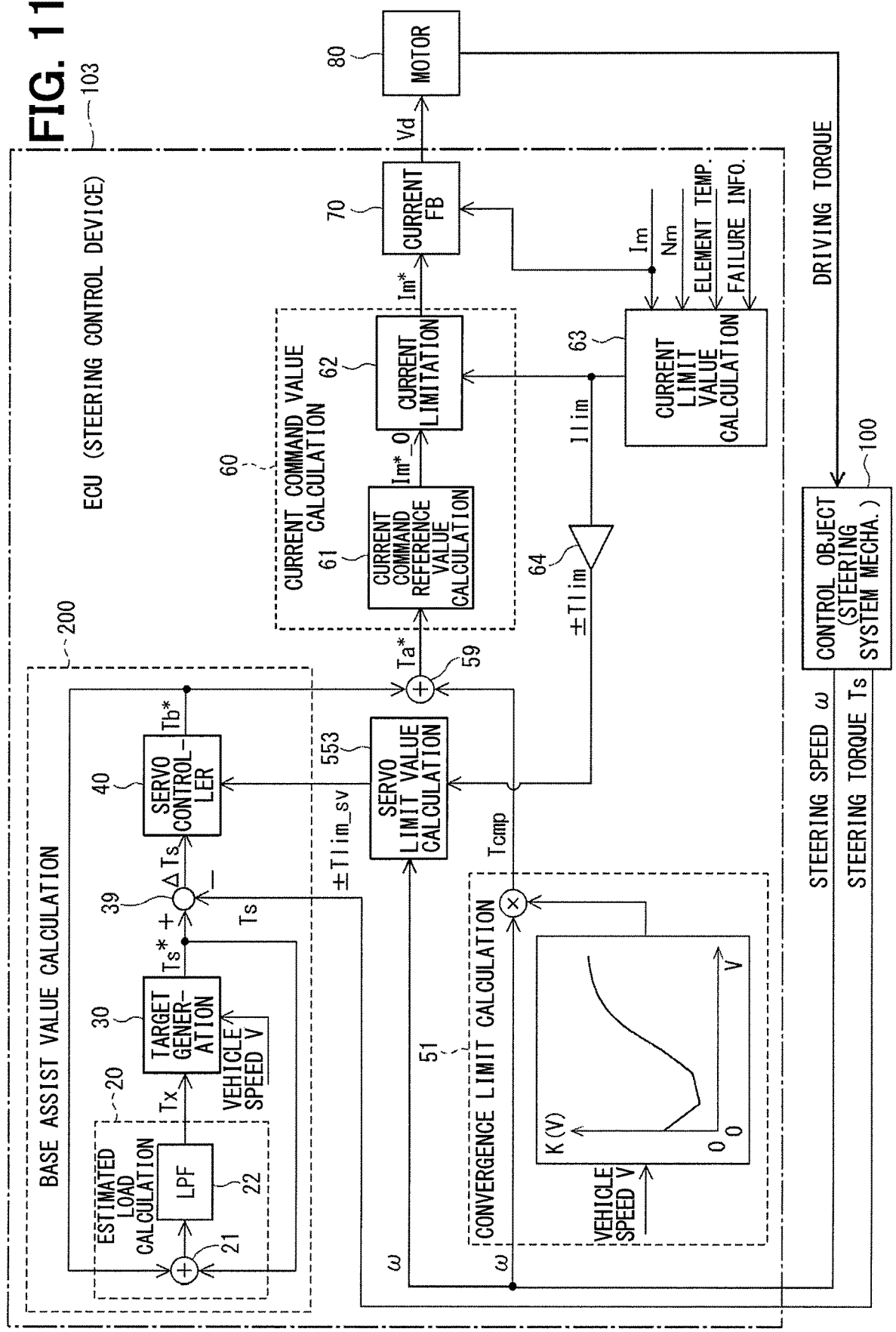
FIG. 11 is a block diagram of an ECU (steering control device) according to a third embodiment.

The third embodiment will be described with reference to FIG. 11 to FIG. 13. As shown in FIG. 11, in the ECU 103 according to the third embodiment, a servo limit value calculation unit 553 calculates the servo limit value ±Tlim_sv based on the torque limit value ±Tlim and the steering speed ω which is the steering state value. Specifically, the servo limit value calculation unit 553 calculates the servo limit value ±Tlim_sv by using the equations (6). The function GUARD(A, US and LB) and the enlargement value α are used in the same manner as used in the equations (5). K is a positive coefficient.

$$+Tlim\_sv=\text{GUARD}(+Tlim+K|\omega|,+Tlim+\alpha,+Tlim)$$

$$-Tlim\_sv=\text{GUARD}(-Tlim-K|\omega|,-Tlim,-Tlim-\alpha) \quad (6)$$

Figure 12:
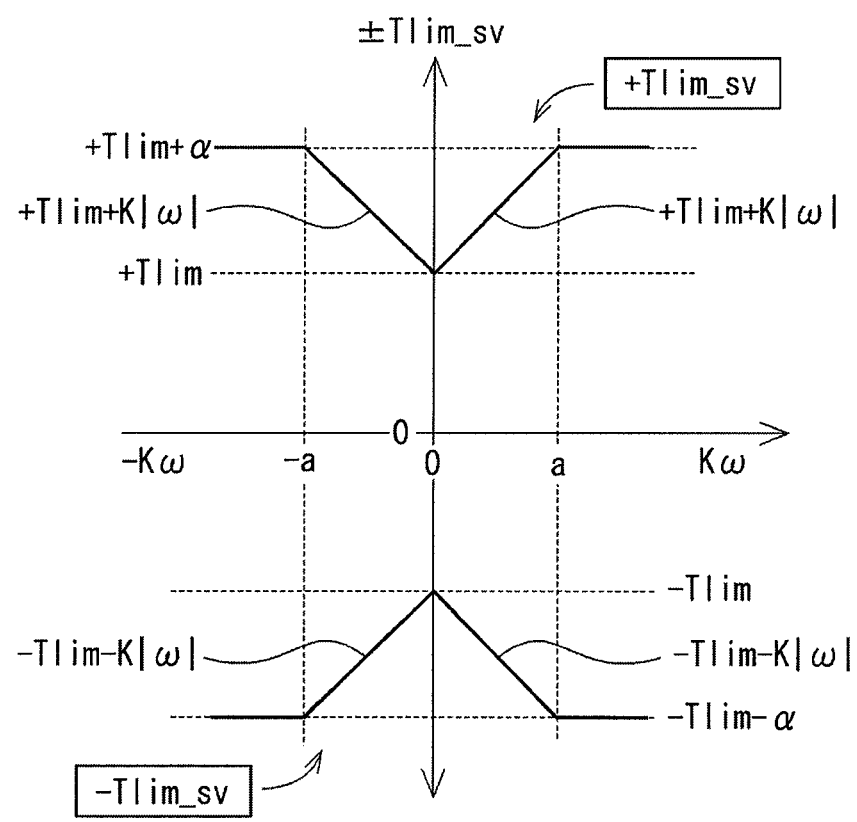
FIG. 12 is a graph showing a relationship between a steering speed and a servo limit value in the third embodiment.

A relationship between the steering speed ω and the servo limit value ±Tlim_sv according to the equations (6) is shown in FIG. 12. The upper limit value of the servo limit value +Tlim_sv is a maximum value of a value (+Tlim+α) determined by adding the enlargement value α to the upper limit value of the torque limit value in a region of "Kω≤−α and α≤Kω" and is a minimum value of the upper limit value +Tlim of the torque limit value under "Kω=0." In addition, the upper limit value +Tlim_sv of the servo limit value is calculated as a value (+Tlim+K|ω|) determined by adding a value, which is calculated by multiplying the absolute value of the steering speed ω by the coefficient K, to the upper limit value +Tlim of the torque limit value in a region of "−α<Kω<α and Kω≠0."

The lower limit value −Tlim_sv of the servo limit value is a minimum value of a value (−Tlim−α) determined by subtracting the enlargement value α from the lower limit value of the torque limit value in a region of "Kω−α and α≤Kω" and is a maximum value of the lower limit value −Tlim of the torque limit value under "Kω=0." In addition, the lower limit value −Tlim_sv of the servo limit value is calculated as a value (−Tlim+Kiwi) determined by adding the value, which is calculated by multiplying the absolute value of the steering speed ω by the coefficient K, to the lower limit value −Tlim of the torque limit value in a region of "−α<Kω<α and Kω≠0."

In summary, the servo limit value calculation unit 553 sets the absolute value |Tlim_sv| of the servo limit value to be equal to or larger than the absolute value |Tlim| of the torque limit value and to be equal to or smaller than a value |Tlim|+α, which is determined by adding the enlargement value α to the absolute value of the torque limit value. In addition, the servo limit value calculation unit 553 of the third embodiment calculates, as the absolute value |Tlim_sv|, by adding a value (Kiwi), which is determined by multiplying the absolute value of the steering speed ω by the positive coefficient K to the absolute value |Tlim| of the torque limit value.

That is, the servo limit value calculation unit 553 calculates the servo limit value ±Tlim_sv in such a manner that the absolute value |Tlim_sv| of the servo limit value becomes larger than the absolute value |Tlim| of the torque limit value in a part of the region of the steering speed ω. Therefore, similarly to the second embodiment, the assist torque command value Ta* determined by adding the correction control value Tcmp to the base assist value Tb* outputted by the servo controller 40 can reach the torque limit value ±Tlim.

Figure 13:
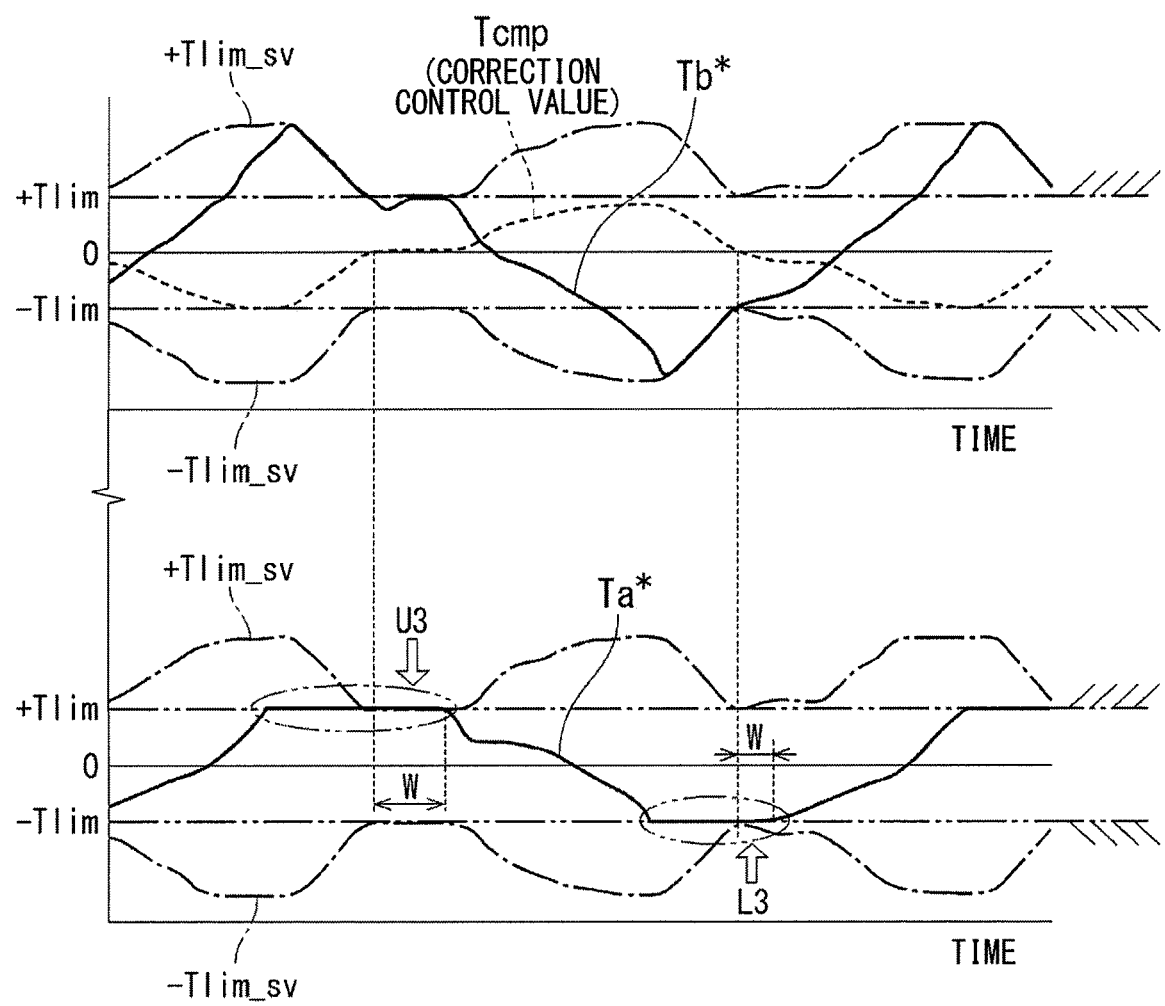
FIG. 13 is a time chart of each calculated value data in an actual vehicle running in the third embodiment.

In FIG. 13, each calculation value data in actually moving a vehicle under the control of the third embodiment is shown. The waveforms shown in FIG. 13 are similar to those of the second embodiment shown in FIG. 9 except that the range of the servo limit value ±Tlim_sv exceeds the range of the torque limit value ±Tlim twice in one cycle of the base assist value Tb*. It is to be understood that the assist torque command value Ta* reaches the torque limit value ±Tlim in situations U3 and L3 surrounded by ellipse marks. Lissajous waveforms of the steering angle θ and the steering torque Ts are almost the same as the waveforms of the second embodiment shown by the solid line in FIG. 10 and hence not shown. In the third embodiment, steering without stuck (non-smoothness) can be performed as in the second embodiment.

It is conventionally proposed to set an upper limit value of integration of a servo controller based on a state value such as a rotation angle of a steering wheel, a rotation angle of a motor or a base assist command value Tb*, for example, in addition to a steering torque Ts. The third embodiment is similar to the conventional control proposal described above in that the servo limit value ±Tlim_sv is calculated based on the steering speed ω, which is a differential value of the rotation angle of the motor.

However, the conventional control proposal has no limitation to the current supply to the motor by the current limit value Ilim. That is, the conventional control proposal does not counter to problem of windup caused when the current is limited and inability of the assist torque command value Ta* after addition of the correction control value Tcmp to reach the torque limit value ±Tlim.

On the other hand, in the third embodiment, the servo limit value ±Tlim_sv is calculated based on the steering speed ω so that the assist torque command value Ta* after addition of the correction control value Tcmp reaches the torque limit value ±Tlim to which the current limit value Ilim is converted.

Fourth Embodiment

Figure 14:
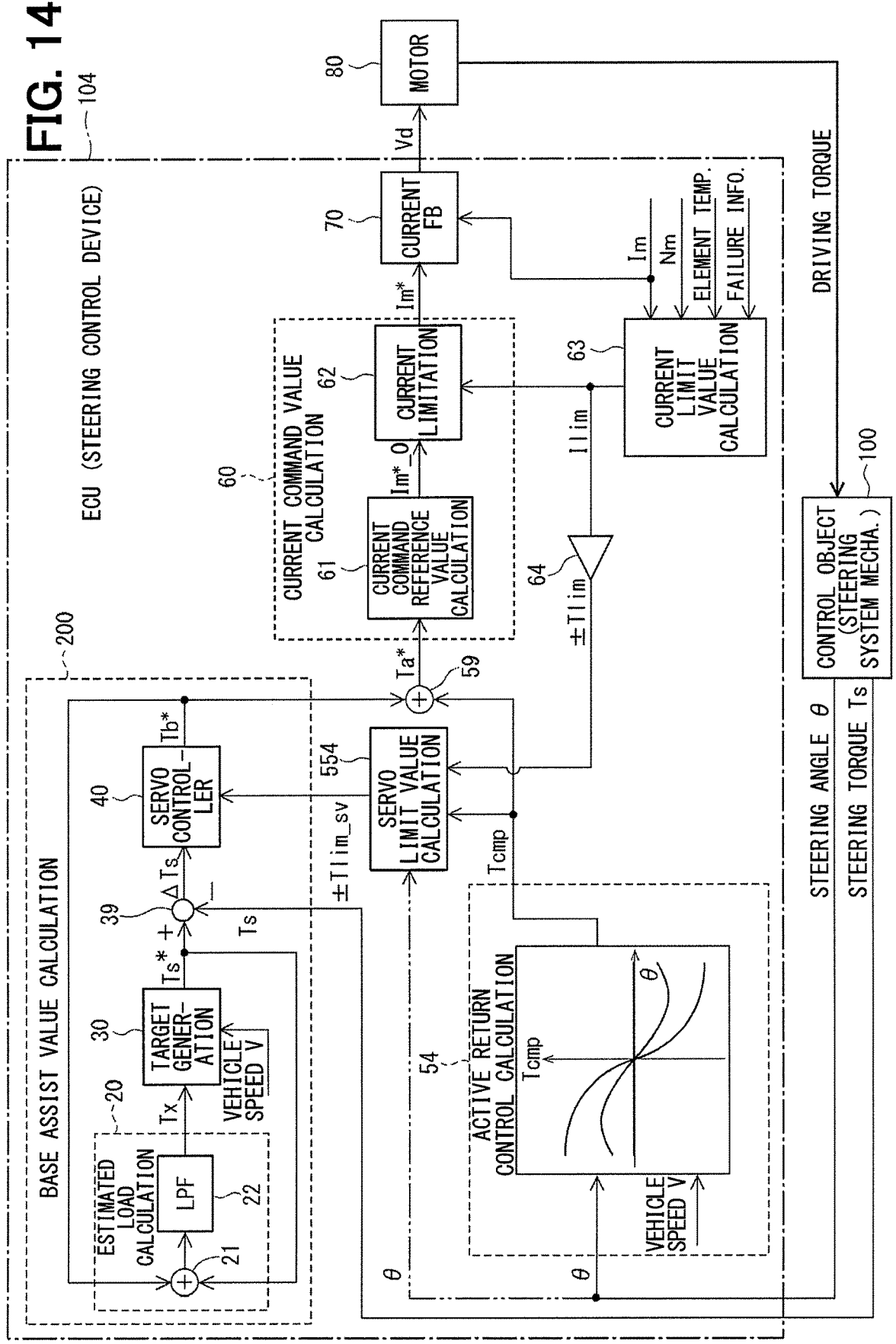
FIG. 14 is a block diagram of an ECU (steering control device) according to a fourth embodiment.

The fourth embodiment will be described with reference to FIG. 14, FIG. 15A and FIG. 15B. As shown in FIG. 14, an ECU 104 of the fourth embodiment includes an active return control calculation unit 54 as the correction control calculation unit. The active return control calculation unit 54 calculates the correction control value Tcmp by active return control that directs the steering wheel 91 toward the neutral position in accordance with the steering angle θ and the vehicle speed V.

Figure 15A:
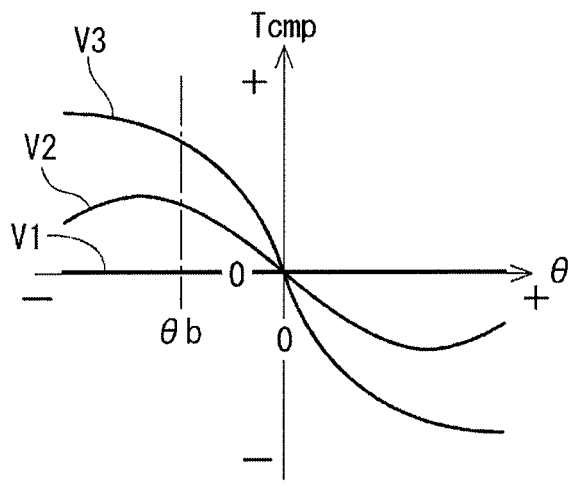
FIG. 15A is a graph showing a relationship between a steering angle and a correction control value in active return control.
Figure 15B:
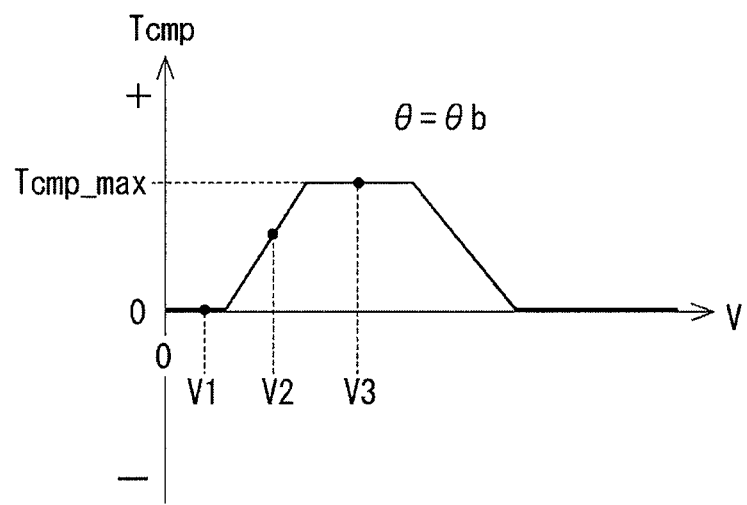
FIG. 15B is a graph showing a relationship between a vehicle speed and a correction control value in active return control.

FIG. 15A and FIG. 15B show a data map of the active return control. As shown in FIG. 15A, a relationship between the steering angle θ and the correction control value Tcmp is expressed symmetrically with respect to the origin. The correction control value Tcmp is 0 or a negative value in case that the steering angle θ is in the positive region. The correction control value Tcmp is 0 or a positive value, in case that the steering angle θ is in the negative region. That is, the correction control value Tcmp directed toward the neutral position in the direction opposite to the direction of the steering angle θ is added to the base assist value Tb*. FIG. 15B defines a relationship between the vehicle speed V and the correction control value Tcmp in case that the steering angle θ is θb (<0). The correction control value Tcmp has a trapezoidal relationship. That is, the correction control value Tcmp is 0 in a low speed region and a high speed region with respect to the vehicle speed V and increases up to a maximum value Tcmp_max in a middle speed region. The relationship between the steering angle θ and the correction control value Tcmp is defined as shown in FIG. 15B in accordance with vehicle speeds V1, V2 and V3, at which the correction control value Tcmp is 0, in the middle of increase and the maximum value Tcmp_max, respectively.

In FIG. 14, the servo limit value calculation unit 554 acquires, in addition to the torque limit value ±Tlim, the correction control value Tcmp indicated by a solid line arrow outputted from the active return control calculation unit 54. In this configuration, the servo limit value calculation unit 554 calculates the servo limit value ±Tlim_sv in the similar manner as in the second embodiment. Alternatively, as indicated by two-dot chain line arrow in FIG. 14, the servo limit value calculation unit 554 may acquire the steering angle θ, which is the steering state value as in the third embodiment, and calculate the servo limit value ±Tlim_sv based on the torque limit value ±Tlim and the steering angle θ.

Since the absolute value |Tlim_sv| of the servo limit value is set to be larger than the absolute value |Tlim| of the torque limit value in at least a part of the region, it is possible to compensate for a decrease in the absolute value of the base assist command value Tb* caused by addition of the correction control value Tcmp of the active return control. Therefore, the ECU 104 can cause the assist torque command value Ta* to reach the torque limit value ±Tlim. The ECU 104 of the fourth embodiment provides the same effects as those of the first to third embodiments in a configuration in which the absolute value of the base assist command value Tb* is decreased by the correction control value Tcmp of the active return control. That is, the ECU 104 can cause the motor 80 to generate the maximum assist torque within the region of the current limit value Ilim during the cut-in steering operation. Therefore, the steering operation feeling of the driver improves.

The ECU which performs both the convergence control and the active return control may calculate the servo limit value ±Tlim_sv based on the correction control value Tcmp determined by addition of the correction control value of the convergence control and the correction control value of the active return control. Alternatively, the ECU may calculate the servo limit value ±Tlim_sv based on both the steering speed ω used for the convergence control and the steering angle θ used for the active return control.

Figure 20:
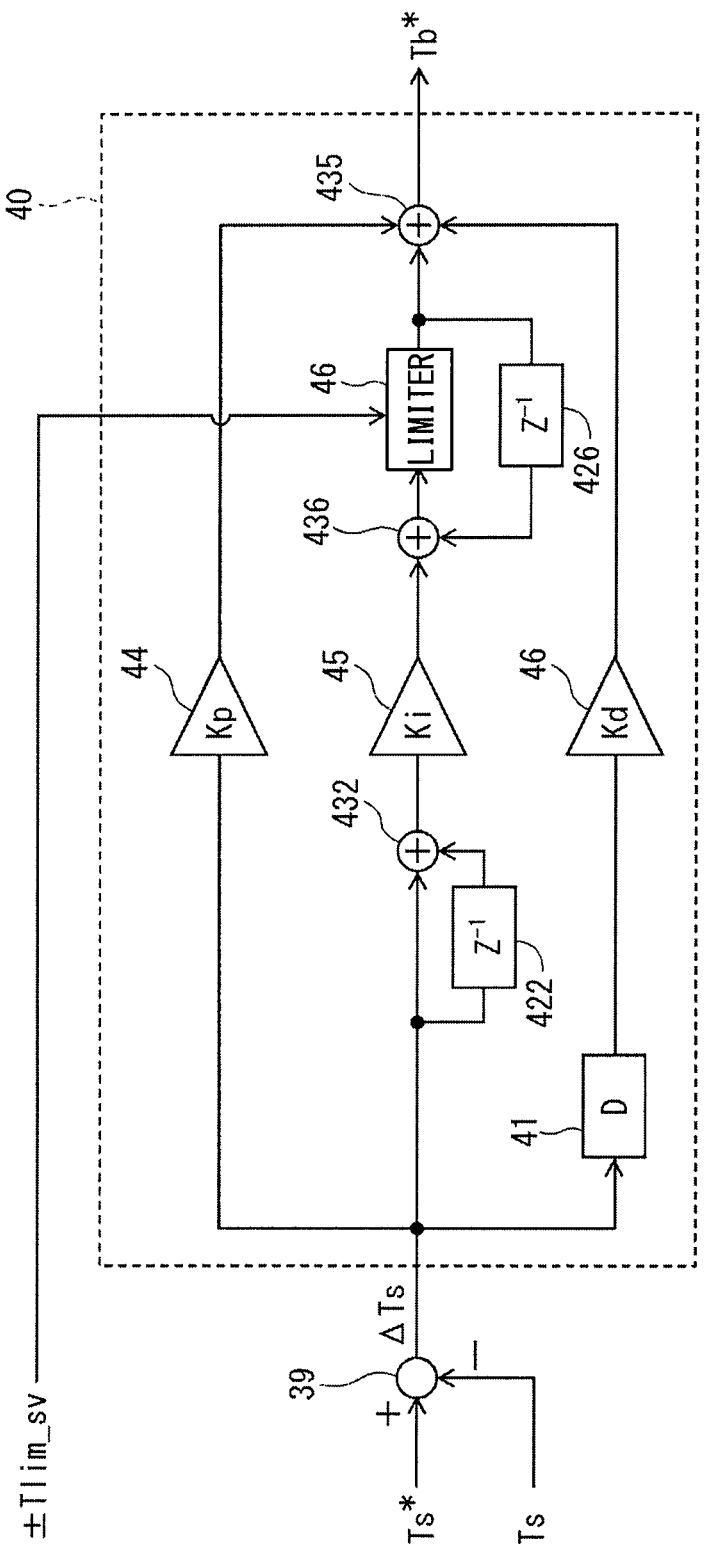
FIG. 20 is a block diagram of a servo controller according to the other embodiment.

Other Embodiment (1) In FIG. 20, a control configuration of the servo controller 40 that is different from FIG. 3 is shown. In the control configuration of FIG. 20, the adder 436 adds the previous value of the integral term inputted via the delay element 426 to the current value of the integral term calculated by the Ki multiplier 45, and the output limiter 46 limits the added value to the servo limit value ±Tlim_sv. Further, the adder 435 adds the proportional term calculated by the Kp multiplier 44 and the differential term calculated by the Kd multiplier 46 are added to the limited value of the integral term, and outputs as the base assist command value Tb*. As described above, in the configuration of FIG. 20, the integral term is limited by the servo limit value ±Tlim_sv in the servo controller 40. Even in this configuration, the reset windup is suppressed.

(2) In the second and third embodiments, the servo limit value ±Tlim_sv is so calculated that the absolute value |Tlim_sv| of the servo limit value becomes larger than the absolute value |Tlim| of the torque limit value in a part of region of the steering speed ω or the correction control value Tcmp. In the other region, the absolute value |Tlim_sv| of the servo limit value is set equal to the absolute value |Tlim| of the torque limit value. On the other hand, as the other embodiment, the absolute value |Tlim_sv| of the servo limit value may be set to a value smaller than the absolute value |Tlim| of the torque limit value in other regions.

The difference between the absolute value |Tlim_sv| of the servo limit value and the absolute value |Tlim| of the torque limit value is preferably determined to compensate for the decrease in the absolute value of the base assist command value Tb* caused by addition of the correction control value Tcmp. However, it is not always necessary to completely compensate for the decrease caused by the correction control value Tcmp. In this case, the assist torque command value Ta* may not reach the torque limit value ±Tlim in some cases. However, it is advantageous that at least the assist torque command value Ta* approaches the torque limit value ±Tlim. Therefore, in comparison with the comparison example in which the output of the servo controller 40 is limited by the torque limit value ±Tlim itself, the output of the motor 80 can be increased and the steering feel at the time of the cut-in steering is improved.

(4) The correction control executed by the ECU is not limited to the convergence control and the active return control, but may be used in any other control. The steering state value used for the correction control may be any physical value that reflects the steering state In addition to the steering speed ω, the steering angle θ and correlated values thereof.

The present disclosure is not limited to the embodiments described above, and various modifications may be made within the scope of the present disclosure.

What is claimed is:

1. A steering control device for controlling current supply to a motor to generate an assist torque in correspondence to a steering torque, the steering control device comprising:
   a target steering torque calculation unit configured to calculate a target steering torque which is a target value of the steering torque;
   a servo controller configured to calculate a base assist torque so that the steering torque follows the target steering torque;
   a servo limit value calculation unit configured to calculate a servo limit value which limits an output of the servo controller, a polarity of which is defined to be positive or negative in accordance with a direction of steering;
   a correction control calculation unit configured to calculate a correction control value in accordance with a steering state value which is a physical value reflecting a steering state;
   a current command value calculation unit configured to calculate a current command value to be supplied to the motor based on an assist torque command value determined by adding the correction control value to the base assist torque;
   a current limit value calculation unit configured to calculate a current limit value with respect to the current command value; and
   a torque converter configured to output a torque limit value determined by converting the current limit value into a torque to the servo limit value calculation unit,
   wherein the servo limit value calculation unit is configured to calculate the servo limit value having an absolute value larger than an absolute value of the torque limit value in at least a part of a region of the steering state value or the correction control value.

2. The steering control device according to claim 1, wherein:
   a difference between the absolute value of the servo limit value and the absolute value of the torque limit value in the at least a part of the region is a value which compensates a decrease in the absolute value of the base assist torque caused by addition of the correction control value.

3. The steering control device according to claim 1, wherein:
   the servo limit value calculation unit is configured to set, as the absolute value of the servo limit value over an entire region of the steering state value or the correction control value, a value calculated by adding a positive enlargement value to the absolute value of the torque limit value.

4. The steering control device according to claim 1, wherein:
   the servo limit value calculation unit is configured to calculate the servo limit value based on the torque limit value and the correction control value.

5. The steering control device according to claim 4, wherein:
   the servo limit value calculation unit is configured to set the absolute value of the servo limit value to be equal to or larger than the absolute value of the torque limit value and equal to or smaller than a value calculated by adding a positive enlargement value to the absolute value of the torque limit value.

6. The steering control device according to claim 5, wherein:
   the servo limit value calculation unit is configured to set the servo limit value by subtracting the correction control value from the torque limit value with respect to an upper limit value and a lower limit value of the servo limit value when the correction control value is a negative value and a positive value, respectively.

7. The steering control device according to claim 1, wherein:
   the servo limit value calculation unit is configured to calculate the servo limit value based on the torque limit value and a steering speed or a steering angle, which is the steering state value.

8. The steering control device according to claim 7, wherein:
   the servo limit value calculation unit is configured to set the absolute value of the servo limit value to be equal to or larger than the torque limit value and equal to or smaller than a value calculated by adding a positive enlargement value to the absolute value of the torque limit value; and
   the servo limit value calculation unit is configured to set, as the absolute value of the servo limit value, a value calculated by adding a value, which is a product of the absolute value of the steering speed or the steering angle and a positive coefficient, to the absolute value of the torque limit value.

9. The steering control device according to claim 1, wherein:

the correction control calculation unit is configured to calculate the correction control value by convergence control, which attenuates the assist torque in accordance with the steering speed, which is the steering state value, and a vehicle speed.

10. The steering control device according to claim 1, wherein:
the correction control calculation unit is configured to calculate the correction control value by active return control, which moves a steering wheel toward a neutral position in accordance with the steering angle, which is the steering state value, and a vehicle speed.

11. The steering control device according to claim 1, wherein:
the servo controller is configured to limit, by the servo limit value, a previous value of an output of an integrator which integrates a difference between the steering torque and the target steering torque, or an integrated value of the previous value of the output of the servo controller.

12. A steering control device for controlling current supply to a motor to generate an assist torque in correspondence to a steering torque, the steering control device comprising:
a processing unit with a memory storing control processing, the processing unit being configured by execution of the control processing to:
calculate a target steering torque which is a target value of the steering torque;
calculate a base assist torque so that the steering torque follows the target steering torque;
calculate a servo limit value which limits an output of a servo controller, a polarity of which is defined to be positive or negative in accordance with a direction of steering;
calculate a correction control value in accordance with a steering state value which is a physical value reflecting a steering state;
calculate a current command value to be supplied to the motor based on an assist torque command value determined by adding the correction control value to the base assist torque;
calculate a current limit value with respect to the current command value; and
output a torque limit value determined by converting the current limit value into a torque,
wherein the processing unit is configured to calculate the servo limit value having an absolute value to be larger than an absolute value of the torque limit value in at least a part of a region of the steering state value or the correction control value.

13. The steering control device according to claim 12, wherein:
a difference between the absolute value of the servo limit value and the absolute value of the torque limit value in the at least a part of the region is a value which compensates a decrease in the absolute value of the base assist torque caused by addition of the correction control value.

14. The steering control device according to claim 12, wherein the processing unit is configured to:
set, as the absolute value of the servo limit value over an entire region of the steering state value or the correction control value, a value calculated by adding a positive enlargement value to the absolute value of the torque limit value.

15. The steering control device according to claim 12, wherein the processing unit is configured to:
calculate the servo limit value based on the torque limit value and the correction control value;
set the absolute value of the servo limit value to be equal to or larger than the absolute value of the torque limit value and equal to or smaller than a value calculated by adding a positive enlargement value to the absolute value of the torque limit value; and
set the servo limit value by subtracting the correction control value from the torque limit value with respect to an upper limit value and a lower limit value of the servo limit value when the correction control value is a negative value and a positive value, respectively.

16. The steering control device according to claim 12, wherein the processing unit is configured to:
calculate the servo limit value based on the torque limit value and a steering speed or a steering angle, which is the steering state value;
set the absolute value of the servo limit value to be equal to or larger than the torque limit value and equal to or smaller than a value calculated by adding a positive enlargement value to the absolute value of the torque limit value; and
set, as the absolute value of the servo limit value, a value calculated by adding a value, which is a product of the absolute value of the steering speed or the steering angle and a positive coefficient, to the absolute value of the torque limit value.

17. The steering control device according to claim 12, wherein the processing unit is configured to:
calculate the correction control value by convergence control, which attenuates the assist torque in accordance with the steering speed, which is the steering state value, and a vehicle speed.

18. The steering control device according to claim 12, wherein the processing unit is configured to:
calculate the correction control value by active return control, which moves a steering wheel toward a neutral position in accordance with the steering angle, which is the steering state value, and a vehicle speed.

19. The steering control device according to claim 12, wherein the processing unit is configured to:
limit, by the servo limit value, a previous value of an output of an integrator which integrates a difference between the steering torque and the target steering torque, or an integrated value of the previous value of the output of the servo controller.

* * * * *